US011589384B2

(12) United States Patent
Li et al.

(10) Patent No.: US 11,589,384 B2
(45) Date of Patent: Feb. 21, 2023

(54) DATA TRANSMISSION METHOD, TERMINAL DEVICE, AND NETWORK DEVICE

(71) Applicant: HUAWEI TECHNOLOGIES CO., LTD., Shenzhen (CN)

(72) Inventors: Yuan Li, Bonn (DE); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 200 days.

(21) Appl. No.: 16/875,711

(22) Filed: May 15, 2020

(65) Prior Publication Data

US 2020/0281015 A1 Sep. 3, 2020

Related U.S. Application Data

(63) Continuation of application No. PCT/CN2017/111751, filed on Nov. 17, 2017.

(51) Int. Cl.

*H04W 74/00* (2009.01)
*H04W 72/12* (2009.01)
*H04W 72/04* (2009.01)

(52) U.S. Cl.

CPC ....... *H04W 74/004* (2013.01); *H04W 72/042* (2013.01); *H04W 72/0446* (2013.01); *H04W 72/0453* (2013.01); *H04W 72/12* (2013.01)

(58) Field of Classification Search

CPC ............. H04W 72/042; H04W 74/004; H04W 72/0446; H04W 72/0453; H04W 72/04; H04W 74/00; H04W 72/12

(Continued)

(56) References Cited

U.S. PATENT DOCUMENTS 7,716,720 B1 5/2010 Marek et al.
2013/0033995 A1* 2/2013 Kraglund .............. H04W 48/16 370/252

(Continued)

FOREIGN PATENT DOCUMENTS

CN 1543117 A 11/2004
CN 106685611 A 5/2017

(Continued)

OTHER PUBLICATIONS

"On channel access for AUL," 3GPP TSG RAN WG1 Meeting #90bis, R1-1717117, Prague, Czech Republic, Total 6 pages, 3rd Generation Partnership Project, Valbonne, France (Oct. 9-13, 2017).

(Continued)

*Primary Examiner* — Angel T Brockman
(74) *Attorney, Agent, or Firm* — Leydig, Voit & Mayer, Ltd.

(57) ABSTRACT

Embodiments of this disclosure provide a data transmission method, a terminal device, and a network device. The method includes: receiving, by a terminal device, indication information sent by a network device, where the indication information is used to indicate a first time domain resource used by the terminal device to send first uplink transmission; and sending, by the terminal device, the first uplink transmission to the network device on the first time domain resource, and sending second uplink transmission to the network device on a second time domain resource, where the second time domain resource is a time domain resource determined by the terminal device based on the first time domain resource, and the first time domain resource and the second time domain resource are consecutive or inconsecutive in time.

20 Claims, 6 Drawing Sheets

(58) Field of Classification Search
USPC .......................................................... 370/329
See application file for complete search history.

(56) References Cited

U.S. PATENT DOCUMENTS

2014/0192767 A1* 7/2014 Au .................... H04W 74/0866 370/329
2019/0149365 A1* 5/2019 Chatterjee ............. H04L 5/0044 370/329
2019/0150177 A1* 5/2019 Chen ................. H04W 72/1268 370/329

FOREIGN PATENT DOCUMENTS

CN 106851822 A 6/2017
CN 106851839 A 6/2017
CN 106912055 A 6/2017
WO 2014109687 A1 7/2014
WO 2017196053 A2 11/2017

OTHER PUBLICATIONS

"Design of power saving signal/channel", 3GPP TSG RAN WG1 Meeting 90bis, Prague, CZ, R1-1717274, total 9 pages, 3rd Generation Partnership Project, Valbonne, France (Oct. 9-13, 2017).
"Channel access for autonomous UL access", 3GPP TSG RAN WG1 Meeting 90bis, Prague, CZ, R1-1717552, total 5 pages, 3rd Generation Partnership Project, Valbonne, France (Oct. 9-13, 2017).
"On channel access for autonomous UL access," 3GPP TSG-RAN WG1 Meeting #90bis, R1-1717242, Prague, Czech Republic, XP051351593, Total 6 pages, 3rd Generation Partnership Project, Valbonne, France (Oct. 9-13, 2017).
"Channel access procedure for autonomous UL access," 3GPP TSG RAN WG1 Meeting #90, R1-1713085, Prague, Czech Republic, Total 4 pages, 3rd Generation Partnership Project, Valbonne, France (Aug. 21-25, 2017).
"Channel access procedure for autonomous UL access," 3GPP TSG RAN WG1 Meeting 90bis, R1-1717263, Prague, CZ, Total 4 pages, 3rd Generation Partnership Project, Valbonne, France (Oct. 9-13, 2017).
"3rd Generation Partnership Project; Technical Specification Group Radio Access Network; NR; Physical layer procedures for data (Release 15)," 3GPP TS 38.214 V1.0.0, pp. 1-32, 3rd Generation Partnership Project, Valbonne, France (Sep. 2017).
"3rd Generation Partnership Project; Technical Specification Group Radio Access Network; Evolved Universal Terrestrial Radio Access (E-UTRA); Physical layer procedures (Release 14)," 3GPP TS 36.213 V14.4.0, Total 462 pages, 3rd Generation Partnership Project, Valbonne, France (Sep. 2017).
"Resource allocation for autonomous UL access," 3GPP TSG RAN WG1 Meeting 90bis, Prague, CZ, R1-1717550, pp. 1-4, 3rd Generation Partnership Project, Valbonne, France (Oct. 9-13, 2017).
"Resource allocation for Autonomous UL Access," 3GPP TSG-RAN WG1 Meeting #90bis, Prague, Czech Republic, R1-1717240, Total 4 pages, 3rd Generation Partnership Project, Valbonne, France (Oct. 9-13, 2017).
"Channel Access for Autonomous UL Access," 3GPP TSG RAN WG1 #90bis, Prague, Czech, R1-1718124 Revision of R1-1713027, Total 4 pages, 3rd Generation Partnership Project, Valbonne, France (Oct. 9-13, 2017).

* cited by examiner

DATA TRANSMISSION METHOD, TERMINAL DEVICE, AND NETWORK DEVICE

CROSS-REFERENCE TO RELATED DISCLOSURES

This application is a continuation of International Disclosure No. PCT/CN2017/111751, filed on Nov. 17, 2017. The disclosure of which is hereby incorporated by reference in its entirety.

TECHNICAL FIELD

This disclosure relates to communications technologies, and in particular, to a data transmission method, a terminal device, and a network device.

BACKGROUND

A licensed-assisted access using long term evolution (LAA-LTE) communications system may extend an available spectrum to a 5 GHz unlicensed frequency band by using a carrier aggregation (CA) technology. With assistance of the licensed spectrum, a terminal device and a network device may respectively transmit downlink transmission and uplink transmission on an unlicensed spectrum.

To share the unlicensed frequency band with another system (for example, a communications system of a different operator or a Wi-Fi network), when sending the uplink transmission by using the unlicensed frequency band, the terminal device in the LAA-LTE communications system uses a listen-before-talk (LBT) channel access mechanism. To be specific, before sending the uplink transmission, the terminal device first performs channel listening on a channel. When determining, through listening, that the channel is idle (that is, when the channel listening succeeds), the terminal device can send the uplink transmission on the channel. After the terminal device successfully performs the channel listening, a maximum time length in which the terminal device can continuously send the uplink transmission is referred to as a maximum channel occupancy time (MCOT).

In the prior art, after the terminal device performs the channel listening, if the uplink transmission transmitted by the terminal device on the channel in the unlicensed frequency band cannot completely occupy the MCOT corresponding to the channel listening, resource utilization and channel utilization of the MCOT are relatively low.

SUMMARY

Embodiments of this disclosure provide a data transmission method, a terminal device, and a network device, to resolve a technical problem that resource utilization and channel utilization of an MCOT are relatively low when uplink transmission transmitted by a terminal device on a channel in an unlicensed frequency band cannot occupy the MCOT corresponding to channel listening.

According to a first aspect, an embodiment of this disclosure provides a data transmission method. The method includes:

receiving, by a terminal device, indication information sent by a network device, where the indication information is used to indicate a first time domain resource used by the terminal device to send first uplink transmission; and sending, by the terminal device, the first uplink transmission to the network device on the first time domain resource, and sending second uplink transmission to the network device on a second time domain resource, where the second time domain resource is a time domain resource determined by the terminal device based on the first time domain resource, and the first time domain resource and the second time domain resource are consecutive or inconsecutive in time.

According to the data transmission method provided in the first aspect, when the uplink transmission sent by the terminal device cannot completely occupy an MCOT, the terminal device may continue to send other uplink transmission by using the MCOT that is not completely occupied. This can improve resource utilization and channel utilization of the MCOT.

In a possible implementation, the indication information is further used to indicate a first frequency domain resource used by the terminal device to send the first uplink transmission, and that the first time domain resource and the second time domain resource are consecutive in time includes:

the first time domain resource and the second time domain resource are consecutive in time when the first frequency domain resource is the same as a second frequency domain resource used to send the second uplink transmission; or the first time domain resource and the second time domain resource are consecutive in time when the first frequency domain resource includes all available frequency domain resources, a full bandwidth resource, or all available physical resource blocks on a carrier carrying the first uplink transmission.

According to the data transmission method provided in the possible implementation, when the first frequency domain resource is the same as the second frequency domain resource, or when the first frequency domain resource includes all the available frequency domain resources on the carrier carrying the first uplink transmission, the full bandwidth resource on the carrier, or all the available physical resource blocks on the carrier, the terminal device sends the second uplink transmission by using the second time domain resource that is consecutive in time with the first time domain resource. This does not affect channel access of another terminal device, or does not cause interference to uplink information sent by another terminal device, and further improves the resource utilization and the channel utilization of the MCOT.

In a possible implementation, when the first time domain resource and the second time domain resource are consecutive in time, and the first time domain resource is earlier than the second time domain resource in time, a start time unit in which the terminal device sends the second uplink transmission is used to carry data information or a reservation signal.

According to the data transmission method provided in the possible implementation, in the MCOT that is not completely occupied, when sending the second uplink transmission by using the second time domain resource that is consecutive in time with the first time domain resource, the terminal device sends the data information or the reservation signal in the start time unit in which the second uplink transmission is sent. This can ensure continuity of channel occupation.

In a possible implementation, when the first time domain resource and the second time domain resource are consecutive in time, and the second time domain resource is earlier than the first time domain resource in time, a start time unit in which the terminal device sends the first uplink transmission is used to carry the data information or the reservation signal.

According to the data transmission method provided in the possible implementation, in the MCOT that is not completely occupied, when sending the second uplink transmission by using the second time domain resource that is consecutive with the first time domain resource, the terminal device sends the data information or the reservation signal in the start time unit in which the first uplink transmission is sent. This can ensure continuity of channel occupation.

In a possible implementation, the indication information is further used to indicate a first frequency domain resource used by the terminal device to send the first uplink transmission, and that the first time domain resource and the second time domain resource are inconsecutive in time includes:

the first time domain resource and the second time domain resource are inconsecutive in time when the first frequency domain resource is different from a second frequency domain resource used to send the second uplink transmission; or the first time domain resource and the second time domain resource are inconsecutive in time when the first frequency domain resource does not include all available frequency domain resources, a full bandwidth resource, or all available physical resource blocks on a carrier carrying the first uplink transmission.

According to the data transmission method provided in the possible implementation, when the first frequency domain resource is different from the second frequency domain resource, or when the first frequency domain resource does not include all the available frequency domain resources on the carrier carrying the first uplink transmission, the full bandwidth resource on the carrier, or all the available physical resource blocks on the carrier, the terminal device sends the second uplink transmission by using the second time domain resource that is inconsecutive in time with the first time domain resource. This can reduce impact on channel access of another terminal device, or avoid causing interference to uplink information sent by another terminal device, and further improve the resource utilization and the channel utilization of the MCOT.

In a possible implementation, that the first time domain resource and the second time domain resource are inconsecutive in time includes:

the first time domain resource is earlier than the second time domain resource in time, and there is a first time interval between an end moment of the first time domain resource in time and a start moment of the second time domain resource in time.

According to the data transmission method provided in the possible implementation, in the MCOT that is not completely occupied, the terminal device sends the second uplink transmission by using the second time domain resource that is at an interval of the first time interval from the first time domain resource. This can avoid causing interference to uplink information sent by another terminal device, and further improve the resource utilization and the channel utilization of the MCOT.

In a possible implementation, the method further includes:

performing, by the terminal device, first channel listening on a channel in the first time interval; and the sending, by the terminal device, second uplink transmission on a second time domain resource includes:

sending, by the terminal device, the second uplink transmission on the second time domain resource when the terminal device successfully performs the first channel listening on the channel.

According to the data transmission method provided in the possible implementation, the first channel listening can avoid causing interference to uplink information sent by another terminal device, and further improve the resource utilization and the channel utilization of the MCOT.

In a possible implementation, that the first time domain resource and the second time domain resource are inconsecutive in time includes:

the second time domain resource is earlier than the first time domain resource in time, and there is a second time interval between an end moment of the second time domain resource in time and a start moment of the first time domain resource in time.

According to the data transmission method provided in the possible implementation, in the MCOT that is not completely occupied, the terminal device sends the second uplink transmission by using the second time domain resource that is at an interval of the second time interval from the first time domain resource. This can reduce impact on channel access of another terminal device, and further improve the resource utilization and the channel utilization of the MCOT.

In a possible implementation, the method further includes:

performing, by the terminal device, second channel listening on a channel in the second time interval; and the sending, by the terminal device, the first uplink transmission on the first time domain resource includes:

sending, by the terminal device, the first uplink transmission on the first time domain resource when the terminal device successfully performs the second channel listening on the channel.

According to the data transmission method provided in the possible implementation, the second channel listening can avoid causing interference to uplink information sent by another terminal device, and further improve the resource utilization and the channel utilization of the MCOT.

In a possible implementation, the first uplink transmission is uplink transmission that the network device schedules the terminal device to send, and the second uplink transmission is uplink transmission that is sent by the terminal device in a grant-free manner.

According to the data transmission method provided in the possible implementation, when the first uplink transmission that the network device schedules the terminal device to send cannot completely occupy the MCOT, the terminal device may continue to send, by using the MCOT that is not completely occupied, the uplink transmission that is sent in the grant-free manner. This can improve the resource utilization and the channel utilization of the MCOT.

In a possible implementation, a maximum channel occupancy time corresponding to third channel listening includes the first time domain resource and the second time domain resource; and when the first time domain resource is earlier than the second time domain resource in time, the third channel listening is channel listening performed before the terminal device sends the first uplink transmission; or when the second time domain resource is earlier than the first time domain resource in time, the third channel listening is channel listening performed before the terminal device sends the second uplink transmission.

According to the data transmission method provided in the possible implementation, when the uplink transmission sent by the terminal device cannot completely occupy the MCOT, the terminal device may continue to send other uplink transmission by using the MCOT that is not completely occupied. This can improve the resource utilization and the channel utilization of the MCOT.

According to a second aspect, an embodiment of this disclosure provides a data transmission method, including:

sending, by a network device, indication information to a terminal device, where the indication information is used to indicate a first time domain resource used by the terminal device to send first uplink transmission; and receiving, by the network device on the first time domain resource, the first uplink transmission sent by the terminal device, and receiving, on a second time domain resource, second uplink transmission sent by the terminal device, where the second time domain resource is a time domain resource determined by the terminal device based on the first time domain resource, and the first time domain resource and the second time domain resource are consecutive or inconsecutive in time.

In a possible implementation, the indication information is further used to indicate a first frequency domain resource used by the terminal device to send the first uplink transmission, and that the first time domain resource and the second time domain resource are consecutive in time includes:

the first time domain resource and the second time domain resource are consecutive in time when the first frequency domain resource is the same as a second frequency domain resource used to send the second uplink transmission; or the first time domain resource and the second time domain resource are consecutive in time when the first frequency domain resource includes all available frequency domain resources, a full bandwidth resource, or all available physical resource blocks on a carrier carrying the first uplink transmission.

In a possible implementation, when the first time domain resource and the second time domain resource are consecutive in time, and the first time domain resource is earlier than the second time domain resource in time, a start time unit in which the network device receives the second uplink transmission is used to carry data information or a reservation signal.

In a possible implementation, when the first time domain resource and the second time domain resource are consecutive in time, and the second time domain resource is earlier than the first time domain resource in time, a start time unit in which the network device receives the first uplink transmission is used to carry the data information or the reservation signal.

In a possible implementation, the indication information is further used to indicate a first frequency domain resource used by the terminal device to send the first uplink transmission, and that the first time domain resource and the second time domain resource are inconsecutive in time includes:

the first time domain resource and the second time domain resource are inconsecutive in time when the first frequency domain resource is different from a second frequency domain resource used to send the second uplink transmission; or the first time domain resource and the second time domain resource are inconsecutive in time when the first frequency domain resource does not include all available frequency domain resources, a full bandwidth resource, or all available physical resource blocks on a carrier carrying the first uplink transmission.

In a possible implementation, that the first time domain resource and the second time domain resource are inconsecutive in time includes:

the first time domain resource is earlier than the second time domain resource in time, and there is a first time interval between an end moment of the first time domain resource in time and a start moment of the second time domain resource in time.

In a possible implementation, the second uplink transmission is uplink transmission that is sent by the terminal device on the second time domain resource when the terminal device successfully performs first channel listening on a channel.

In a possible implementation, that the first time domain resource and the second time domain resource are inconsecutive in time includes:

the second time domain resource is earlier than the first time domain resource in time, and there is a second time interval between an end moment of the second time domain resource in time and a start moment of the first time domain resource in time.

In a possible implementation, the first uplink transmission is uplink transmission that is sent by the terminal device on the first time domain resource when the terminal device successfully performs second channel listening on a channel.

In a possible implementation, the first uplink transmission is uplink transmission that the network device schedules the terminal device to send, and the second uplink transmission is uplink transmission that is sent by the terminal device in a grant-free manner.

In a possible implementation, a maximum channel occupancy time corresponding to third channel listening includes the first time domain resource and the second time domain resource; and when the first time domain resource is earlier than the second time domain resource in time, the third channel listening is channel listening performed before the terminal device sends the first uplink transmission; or when the second time domain resource is earlier than the first time domain resource in time, the third channel listening is channel listening performed before the terminal device sends the second uplink transmission.

For beneficial effects of the data transmission method provided in the second aspect and the possible implementations of the second aspect, refer to the beneficial effects of the first aspect and the possible implementations of the first aspect. Details are not described herein again.

According to a third aspect, an embodiment of this disclosure provides a terminal device, including:

a receiving module, configured to receive indication information sent by a network device, where the indication information is used to indicate a first time domain resource used by the terminal device to send first uplink transmission; and a transmitting module, configured to: send the first uplink transmission to the network device on the first time domain resource, and send second uplink transmission to the network device on a second time domain resource, where the second time domain resource is a time domain resource determined by a processing module based on the first time domain resource, and the first time domain resource and the second time domain resource are consecutive or inconsecutive in time.

In a possible implementation, the indication information is further used to indicate a first frequency domain resource used by the terminal device to send the first uplink transmission, and that the first time domain resource and the second time domain resource are consecutive in time includes:

the first time domain resource and the second time domain resource are consecutive in time when the first frequency domain resource is the same as a second frequency domain resource used to send the second uplink transmission; or the first time domain resource and the second time domain resource are consecutive in time when the first frequency domain resource includes all available frequency domain resources, a full bandwidth resource, or all available physical resource blocks on a carrier carrying the first uplink transmission.

In a possible implementation, when the first time domain resource and the second time domain resource are consecutive in time, and the first time domain resource is earlier than the second time domain resource in time, a start time unit in which the transmitting module sends the second uplink transmission is used to carry data information or a reservation signal.

In a possible implementation, when the first time domain resource and the second time domain resource are consecutive in time, and the second time domain resource is earlier than the first time domain resource in time, a start time unit in which the transmitting module sends the first uplink transmission is used to carry the data information or the reservation signal.

In a possible implementation, the indication information is further used to indicate a first frequency domain resource used by the terminal device to send the first uplink transmission, and that the first time domain resource and the second time domain resource are inconsecutive in time includes:

the first time domain resource and the second time domain resource are inconsecutive in time when the first frequency domain resource is different from a second frequency domain resource used to send the second uplink transmission; or the first time domain resource and the second time domain resource are inconsecutive in time when the first frequency domain resource does not include all available frequency domain resources, a full bandwidth resource, or all available physical resource blocks on a carrier carrying the first uplink transmission.

In a possible implementation, that the first time domain resource and the second time domain resource are inconsecutive in time includes:

the first time domain resource is earlier than the second time domain resource in time, and there is a first time interval between an end moment of the first time domain resource in time and a start moment of the second time domain resource in time.

In a possible implementation, the processing module is further configured to perform first channel listening on a channel in the first time interval; and the transmitting module is specifically configured to send the second uplink transmission on the second time domain resource when the processing module successfully performs the first channel listening on the channel.

In a possible implementation, that the first time domain resource and the second time domain resource are inconsecutive in time includes:

the second time domain resource is earlier than the first time domain resource in time, and there is a second time interval between an end moment of the second time domain resource in time and a start moment of the first time domain resource in time.

In a possible implementation, the processing module is further configured to perform second channel listening on a channel in the second time interval; and the transmitting module is specifically configured to send the first uplink transmission on the first time domain resource when the processing module successfully performs the second channel listening on the channel.

In a possible implementation, the first uplink transmission is uplink transmission that the network device schedules the terminal device to send, and the second uplink transmission is uplink transmission that is sent by the terminal device in a grant-free manner.

In a possible implementation, a maximum channel occupancy time corresponding to third channel listening includes the first time domain resource and the second time domain resource; and when the first time domain resource is earlier than the second time domain resource in time, the third channel listening is channel listening performed before the terminal device sends the first uplink transmission; or when the second time domain resource is earlier than the first time domain resource in time, the third channel listening is channel listening performed before the terminal device sends the second uplink transmission.

For beneficial effects of the terminal device provided in the third aspect and the possible implementations of the third aspect, refer to the beneficial effects of the first aspect and the possible implementations of the first aspect. Details are not described herein again.

According to a fourth aspect, an embodiment of this disclosure provides a network device, including:

a transmitting module, configured to send indication information to a terminal device, where the indication information is used to indicate a first time domain resource used by the terminal device to send first uplink transmission; and a receiving module, configured to: receive, on the first time domain resource, the first uplink transmission sent by the terminal device, and receive, on a second time domain resource, second uplink transmission sent by the terminal device, where the second time domain resource is a time domain resource determined by the terminal device based on the first time domain resource, and the first time domain resource and the second time domain resource are consecutive or inconsecutive in time.

In a possible implementation, the indication information is further used to indicate a first frequency domain resource used by the terminal device to send the first uplink transmission, and that the first time domain resource and the second time domain resource are consecutive in time includes:

the first time domain resource and the second time domain resource are consecutive in time when the first frequency domain resource is the same as a second frequency domain resource used to send the second uplink transmission; or the first time domain resource and the second time domain resource are consecutive in time when the first frequency domain resource includes all available frequency domain resources, a full bandwidth resource, or all available physical resource blocks on a carrier carrying the first uplink transmission.

In a possible implementation, when the first time domain resource and the second time domain resource are consecutive in time, and the first time domain resource is earlier than the second time domain resource in time, a start time unit in which the receiving module receives the second uplink transmission is used to carry data information or a reservation signal.

In a possible implementation, when the first time domain resource and the second time domain resource are consecutive in time, and the second time domain resource is earlier than the first time domain resource in time, a start time unit in which the receiving module receives the first uplink transmission is used to carry the data information or the reservation signal.

In a possible implementation, the indication information is further used to indicate a first frequency domain resource used by the terminal device to send the first uplink transmission, and that the first time domain resource and the second time domain resource are inconsecutive in time includes:

the first time domain resource and the second time domain resource are inconsecutive in time when the first frequency domain resource is different from a second frequency domain resource used to send the second uplink transmission; or the first time domain resource and the second time domain resource are inconsecutive in time when the first frequency domain resource does not include all available frequency domain resources, a full bandwidth resource, or all available physical resource blocks on a carrier carrying the first uplink transmission.

In a possible implementation, that the first time domain resource and the second time domain resource are inconsecutive in time includes:

the first time domain resource is earlier than the second time domain resource in time, and there is a first time interval between an end moment of the first time domain resource in time and a start moment of the second time domain resource in time.

In a possible implementation, the second uplink transmission is uplink transmission that is sent by the terminal device on the second time domain resource when the terminal device successfully performs first channel listening on a channel.

In a possible implementation, that the first time domain resource and the second time domain resource are inconsecutive in time includes:

the second time domain resource is earlier than the first time domain resource in time, and there is a second time interval between an end moment of the second time domain resource in time and a start moment of the first time domain resource in time.

In a possible implementation, the first uplink transmission is uplink transmission that is sent by the terminal device on the first time domain resource when the terminal device successfully performs second channel listening on a channel.

In a possible implementation, the first uplink transmission is uplink transmission that the network device schedules the terminal device to send, and the second uplink transmission is uplink transmission that is sent by the terminal device in a grant-free manner.

In a possible implementation, a maximum channel occupancy time corresponding to third channel listening includes the first time domain resource and the second time domain resource; and when the first time domain resource is earlier than the second time domain resource in time, the third channel listening is channel listening performed before the terminal device sends the first uplink transmission; or when the second time domain resource is earlier than the first time domain resource in time, the third channel listening is channel listening performed before the terminal device sends the second uplink transmission.

For beneficial effects of the network device provided in the fourth aspect and the possible implementations of the fourth aspect, refer to the beneficial effects of the first aspect and the possible implementations of the first aspect. Details are not described herein again.

According to a fifth aspect, an embodiment of this disclosure provides a terminal device, including:

a receiver, configured to receive indication information sent by a network device, where the indication information is used to indicate a first time domain resource used by the terminal device to send first uplink transmission; and a transmitter, configured to: send the first uplink transmission to the network device on the first time domain resource, and send second uplink transmission to the network device on a second time domain resource, where the second time domain resource is a time domain resource determined by a processor based on the first time domain resource, and the first time domain resource and the second time domain resource are consecutive or inconsecutive in time.

In a possible implementation, the indication information is further used to indicate a first frequency domain resource used by the terminal device to send the first uplink transmission, and that the first time domain resource and the second time domain resource are consecutive in time includes:

the first time domain resource and the second time domain resource are consecutive in time when the first frequency domain resource is the same as a second frequency domain resource used to send the second uplink transmission; or the first time domain resource and the second time domain resource are consecutive in time when the first frequency domain resource includes all available frequency domain resources, a full bandwidth resource, or all available physical resource blocks on a carrier carrying the first uplink transmission.

In a possible implementation, when the first time domain resource and the second time domain resource are consecutive in time, and the first time domain resource is earlier than the second time domain resource in time, a start time unit in which the transmitter sends the second uplink transmission is used to carry data information or a reservation signal.

In a possible implementation, when the first time domain resource and the second time domain resource are consecutive in time, and the second time domain resource is earlier than the first time domain resource in time, a start time unit in which the transmitter sends the first uplink transmission is used to carry the data information or the reservation signal.

In a possible implementation, the indication information is further used to indicate a first frequency domain resource used by the terminal device to send the first uplink transmission, and that the first time domain resource and the second time domain resource are inconsecutive in time includes:

the first time domain resource and the second time domain resource are inconsecutive in time when the first frequency domain resource is different from a second frequency domain resource used to send the second uplink transmission; or the first time domain resource and the second time domain resource are inconsecutive in time when the first frequency domain resource does not include all available frequency domain resources, a full bandwidth resource, or all available physical resource blocks on a carrier carrying the first uplink transmission.

In a possible implementation, that the first time domain resource and the second time domain resource are inconsecutive in time includes:

the first time domain resource is earlier than the second time domain resource in time, and there is a first time interval between an end moment of the first time domain resource in time and a start moment of the second time domain resource in time.

In a possible implementation, the processor is further configured to perform first channel listening on a channel in the first time interval; and the transmitter is specifically configured to send the second uplink transmission on the second time domain resource when the processor successfully performs the first channel listening on the channel.

In a possible implementation, that the first time domain resource and the second time domain resource are inconsecutive in time includes:

the second time domain resource is earlier than the first time domain resource in time, and there is a second time interval between an end moment of the second time domain resource in time and a start moment of the first time domain resource in time.

In a possible implementation, the processor is further configured to perform second channel listening on a channel in the second time interval; and the transmitter is specifically configured to send the first uplink transmission on the first time domain resource when the processor successfully performs the second channel listening on the channel.

In a possible implementation, the first uplink transmission is uplink transmission that the network device schedules the terminal device to send, and the second uplink transmission is uplink transmission that is sent by the terminal device in a grant-free manner.

In a possible implementation, a maximum channel occupancy time corresponding to third channel listening includes the first time domain resource and the second time domain resource; and when the first time domain resource is earlier than the second time domain resource in time, the third channel listening is channel listening performed before the terminal device sends the first uplink transmission; or when the second time domain resource is earlier than the first time domain resource in time, the third channel listening is channel listening performed before the terminal device sends the second uplink transmission.

For beneficial effects of the terminal device provided in the fifth aspect and the possible implementations of the fifth aspect, refer to the beneficial effects of the first aspect and the possible implementations of the first aspect. Details are not described herein again.

According to a sixth aspect, an embodiment of this disclosure provides a network device, including:

a transmitter, configured to send indication information to a terminal device, where the indication information is used to indicate a first time domain resource used by the terminal device to send first uplink transmission; and a receiver, configured to: receive, on the first time domain resource, the first uplink transmission sent by the terminal device, and receive, on a second time domain resource, second uplink transmission sent by the terminal device, where the second time domain resource is a time domain resource determined by the terminal device based on the first time domain resource, and the first time domain resource and the second time domain resource are consecutive or inconsecutive in time.

In a possible implementation, the indication information is further used to indicate a first frequency domain resource used by the terminal device to send the first uplink transmission, and that the first time domain resource and the second time domain resource are consecutive in time includes:

the first time domain resource and the second time domain resource are consecutive in time when the first frequency domain resource is the same as a second frequency domain resource used to send the second uplink transmission; or the first time domain resource and the second time domain resource are consecutive in time when the first frequency domain resource includes all available frequency domain resources, a full bandwidth resource, or all available physical resource blocks on a carrier carrying the first uplink transmission.

In a possible implementation, when the first time domain resource and the second time domain resource are consecutive in time, and the first time domain resource is earlier than the second time domain resource in time, a start time unit in which the receiver receives the second uplink transmission is used to carry data information or a reservation signal.

In a possible implementation, when the first time domain resource and the second time domain resource are consecutive in time, and the second time domain resource is earlier than the first time domain resource in time, a start time unit in which the receiver receives the first uplink transmission is used to carry the data information or the reservation signal.

In a possible implementation, the indication information is further used to indicate a first frequency domain resource used by the terminal device to send the first uplink transmission, and that the first time domain resource and the second time domain resource are inconsecutive in time includes:

the first time domain resource and the second time domain resource are inconsecutive in time when the first frequency domain resource is different from a second frequency domain resource used to send the second uplink transmission; or the first time domain resource and the second time domain resource are inconsecutive in time when the first frequency domain resource does not include all available frequency domain resources, a full bandwidth resource, or all available physical resource blocks on a carrier carrying the first uplink transmission.

In a possible implementation, that the first time domain resource and the second time domain resource are inconsecutive in time includes:

the first time domain resource is earlier than the second time domain resource in time, and there is a first time interval between an end moment of the first time domain resource in time and a start moment of the second time domain resource in time.

In a possible implementation, the second uplink transmission is uplink transmission that is sent by the terminal device on the second time domain resource when the terminal device successfully performs first channel listening on a channel.

In a possible implementation, that the first time domain resource and the second time domain resource are inconsecutive in time includes:

the second time domain resource is earlier than the first time domain resource in time, and there is a second time interval between an end moment of the second time domain resource in time and a start moment of the first time domain resource in time.

In a possible implementation, the first uplink transmission is uplink transmission that is sent by the terminal device on the first time domain resource when the terminal device successfully performs second channel listening on a channel.

In a possible implementation, the first uplink transmission is uplink transmission that the network device schedules the terminal device to send, and the second uplink transmission is uplink transmission that is sent by the terminal device in a grant-free manner.

In a possible implementation, a maximum channel occupancy time corresponding to third channel listening includes the first time domain resource and the second time domain resource; and when the first time domain resource is earlier than the second time domain resource in time, the third channel listening is channel listening performed before the terminal device sends the first uplink transmission; or when the second time domain resource is earlier than the first time domain resource in time, the third channel listening is channel listening performed before the terminal device sends the second uplink transmission.

For beneficial effects of the network device provided in the sixth aspect and the possible implementations of the sixth aspect, refer to the beneficial effects of the first aspect and the possible implementations of the first aspect. Details are not described herein again.

According to a seventh aspect, an embodiment of this disclosure provides a terminal device. The terminal device includes at least one processing element (or chip) configured to perform the method according to the first aspect.

According to an eighth aspect, an embodiment of this disclosure provides a network device. The network device includes at least one processing element (or chip) configured to perform the method according to the second aspect.

According to a ninth aspect, an embodiment of this disclosure provides a program. When executed by a processor, the program is used to perform the method according to the first aspect.

According to a tenth aspect, an embodiment of this disclosure provides a program. When executed by a processor, the program is used to perform the method according to the second aspect.

According to an eleventh aspect, an embodiment of this disclosure provides a program product, for example, a computer-readable storage medium, including the program according to the ninth aspect.

According to a twelfth aspect, an embodiment of this disclosure provides a program product, for example, a computer-readable storage medium, including the program according to the tenth aspect.

According to a thirteenth aspect, an embodiment of this disclosure provides a computer-readable storage medium. The computer-readable storage medium stores an instruction. When the instruction is run on a computer, the computer is enabled to perform the method according to the first aspect.

According to a fourteenth aspect, an embodiment of this disclosure provides a computer-readable storage medium. The computer-readable storage medium stores an instruction. When the instruction is run on a computer, the computer is enabled to perform the method according to the second aspect.

According to the data transmission method, the terminal device, and the network device provided in the embodiments of this disclosure, when the uplink transmission sent by the terminal device cannot completely occupy the MCOT, the terminal device may continue to send other uplink transmission by using the MCOT that is not completely occupied. This can improve the resource utilization and the channel utilization of the MCOT.

DESCRIPTION OF EMBODIMENTS

Figure 1:
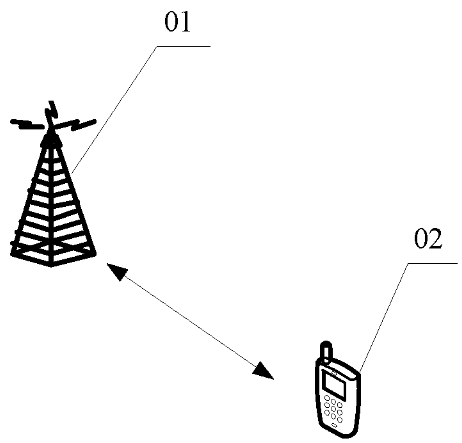
FIG. 1 is a framework diagram of a communications system according to an embodiment of this disclosure.

FIG. 1 is a framework diagram of a communications system according to an embodiment of this disclosure. As shown in FIG. 1, the communications system includes a network device 01 and a terminal device 02.

The network device 01 may be a base station or various radio access points, or may be a device that communicates with the terminal device over an air interface by using one or more sectors in an access network. The base station may be configured to mutually convert a received over-the-air frame and an internet protocol (IP) packet and serve as a router between a wireless terminal and a remaining portion of the access network, and the remaining portion of the access network may include an IP network. The base station may further coordinate attribute management of the air interface. For example, the base station may be a base transceiver station (BTS) in a global system for mobile communications (GSM) or code division multiple access (CDMA), a NodeB (NB) in wideband code division multiple access (WCDMA), an evolved NodeB (eNB or eNodeB) in long term evolution (LTE), a relay node or an access point, or a gNodeB gNB in a future 5G network. This is not limited herein.

The terminal device 02 may be a wireless terminal or a wired terminal. The wireless terminal may refer to a device that provides a user with voice and/or other service data connectivity, a handheld device with a radio connection function, or another processing device connected to a radio modem. The wireless terminal may communicate with one or more core networks through a radio access network (RAN). The wireless terminal may be a mobile terminal, such as a mobile phone (also referred to as a “cellular” phone) and a computer with a mobile terminal, for example, may be a portable, pocket-sized, handheld, computer built-in, or vehicle-mounted mobile apparatus, which exchanges voice and/or data with the radio access network. For example, it may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile, a remote station, a remote terminal, an access terminal, a user terminal, a user agent, a user device, or a sensor having a network access function. This is not limited herein.

It should be noted that the foregoing communications system may be an LTE communications system, or may be another future communications system, for example, a 5G communications system. This is not limited herein. In this embodiment of this disclosure, the communications system may operate on a licensed spectrum, or may operate on an unlicensed spectrum. To be specific, the network device sends downlink information on the licensed spectrum or the unlicensed spectrum, and the terminal device sends uplink information on the licensed spectrum or the unlicensed spectrum.

An LAA-LTE communications system may extend an available spectrum to a 5 GHz unlicensed frequency band by using a CA technology. With assistance of the licensed spectrum, the terminal device and the network device may respectively transmit downlink transmission and uplink transmission on the unlicensed spectrum.

To share the unlicensed frequency band with another system (for example, a communications system of a different operator or a Wi-Fi network), when sending the uplink transmission by using the unlicensed frequency band, the terminal device in the LAA-LTE communications system uses an LBT channel access mechanism. To be specific, before sending the uplink transmission, the terminal device first performs channel listening on a channel. When determining, through listening, that the channel is idle (that is, when the channel listening succeeds), the terminal device may send the uplink transmission on the channel. When determining, through listening, that the channel is busy (that is, when the channel listening fails), the terminal device abandons sending the uplink transmission on the channel. It should be noted that after the terminal device successfully performs the channel listening, a maximum time length in which the terminal device can continuously send the uplink transmission is referred to as a maximum channel occupancy time (MCOT). In other words, after continuously occupying the channel for a length of the MCOT, the terminal device needs to release the channel. If the terminal device needs to continue to send uplink transmission, the terminal device can access the channel only after performing LBT again. The foregoing uplink transmission may also be referred to as uplink burst transmission, an uplink burst, or the like.

Currently, there are two types of channel listening:

A first-type channel listening is channel listening of a long-listening type. To be specific, when the terminal device performs the first-type channel listening, it takes a relatively long time from starting to perform the channel listening to successfully performing the channel listening. In some embodiments, the first-type channel listening may also be referred to as type 1 channel access. Currently, a common first-type channel listening includes random backoff-based clear channel assessment (CCA).

A procedure in which the terminal device performs the random backoff-based CCA may be as follows: The terminal device may uniformly and randomly generate a value N of a backoff counter between 0 and an initial contention window size (CWS), and perform channel listening on a carrier at a granularity of a listening slot (for example, duration of 9 μs). The initial contention window size may be specifically determined based on a configuration of the network device.

If the terminal device detects that the channel is idle within the listening slot, the backoff counter is decremented by 1. If the terminal device detects that the channel is busy within the listening slot, the backoff counter is paused, and is not decremented by 1. To be specific, the value of the backoff counter remains unchanged when the channel is busy, and the backoff counter counts down again until the terminal device detects that the channel is idle. During specific implementation, the terminal device may compare a power, on the channel, received in the listening slot with an energy detection (CCA-ED) threshold. If the power on the channel is greater than or equal to the CCA-ED, it is determined that the channel is busy; or if the power on the channel is less than the CCA-ED, it is determined that the channel is idle.

When the backoff counter is decremented to zero, the terminal device may determine that the channel listening succeeds (which may also be referred to as an LBT listening success). In this scenario, the terminal device may immediately occupy the channel to send the uplink transmission. In some embodiments, the terminal device may alternatively wait for a period of time after decrementing the backoff counter to zero. After the waiting ends, the terminal device may perform listening on the channel once by using an additional slot (for example, 9 μs or 25 μs+9*k μs, where k is zero or a positive integer). If the terminal device learns, through listening within the additional slot, that the channel is idle, the terminal device may determine that the channel listening succeeds. In this scenario, the terminal device may immediately occupy the channel to send the uplink transmission.

If the terminal device does not decrement the backoff counter to zero before a time domain resource that the terminal device intends to occupy, or the terminal device decrements the backoff counter to zero before a time domain resource that the terminal device intends to occupy but learns, through listening within the additional listening slot, that the channel is busy, the terminal device may determine that the channel listening fails (which may also be referred to as an LBT listening failure). In this case, the terminal device abandons sending the uplink transmission on the channel.

It should be noted that when the terminal device performs the random backoff-based CCA, an MCOT corresponding to the random backoff-based CCA may be determined based on an access priority class of to-be-sent uplink transmission. Correspondingly, values of initial contention windows sizes, of the random backoff-based CCA, corresponding to MCOTs of different lengths are also different. For example, there may be four access priority classes, and each access priority class corresponds to one set of channel listening parameters. The channel listening parameters include a contention window set, a maximum channel occupancy time, and the like. For example, a CWS set of an access priority class 1 is {3, 7}, and a maximum channel occupancy time of the access priority class 1 is 2 ms; a CWS set of an access priority class 2 is {7, 15}, and a maximum channel occupancy time of the access priority class 2 is 4 ms; a CWS set of an access priority class 3 is {15, 31, 63, 127, 255, 511, 1023}, and a maximum channel occupancy time of the access priority class 3 is 6 ms or 10 ms; and a CWS set of an access priority class 4 is {15, 31, 63, 127, 255, 511, 1023}, and a maximum channel occupancy time of the access priority class 4 is 6 ms or 10 ms.

A second-type channel listening is channel listening of a short-listening type. To be specific, when the terminal device performs the second-type channel listening, it takes a relatively short time from starting to perform the channel listening to successfully performing the channel listening. In some embodiments, the second-type channel listening may also be referred to as type 2 channel access. Currently, a common second-type channel listening includes single-slot CCA. In some embodiments, the single-slot CCA is also referred to as one shot CCA or 25 μs CCA.

A procedure in which the terminal device performs the single-slot CCA may be as follows: The terminal device performs, on the channel, listening in a single slot whose length is a preset time length (for example, 25 μs). If the terminal device detects, within the single slot, that the channel is idle, the terminal device determines that the channel listening succeeds. In this scenario, the terminal device may immediately occupy the channel to send the uplink transmission. If the terminal device detects, within the single slot, that the channel is busy, the terminal device determines that the channel listening fails. In this scenario, the terminal device abandons sending the uplink transmission on the channel. During specific implementation, the terminal device may compare a power, on the channel, received in the single slot with a CCA-ED threshold. If the power on the channel is greater than or equal to the CCA-ED threshold, it is determined that the channel is busy; or if the power on the channel is less than the CCA-ED, it is determined that the channel is idle.

It may be understood that the second-type channel listening may alternatively be other channel listening that can be quickly performed on a carrier. This is not limited herein. In addition, listening duration of the second-type channel listening is also not limited to 25 μs, and may alternatively be longer or shorter duration. A quantity of times of the second-type channel listening is not limited to 1, and may alternatively be 2, 3, or more. This is not specifically limited herein.

In the prior art, the terminal device may perform the first-type channel listening before sending any uplink transmission, and may access the channel to send the uplink transmission after the channel listening succeeds. In this case, if the uplink transmission cannot completely occupy an MCOT corresponding to the first-type channel listening, resource utilization and channel utilization of the MCOT are relatively low.

In consideration of the foregoing problem, an embodiment of this disclosure provides a data transmission method, to enable the terminal device to continue to send other uplink transmission by using the MCOT that is not completely occupied. This can improve the resource utilization and the channel utilization of the MCOT. The following describes the technical solutions of this disclosure in detail by using some embodiments. The following several embodiments may be combined with each other, and a same or similar concept or process may not be described repeatedly in some embodiments.

Figure 2:
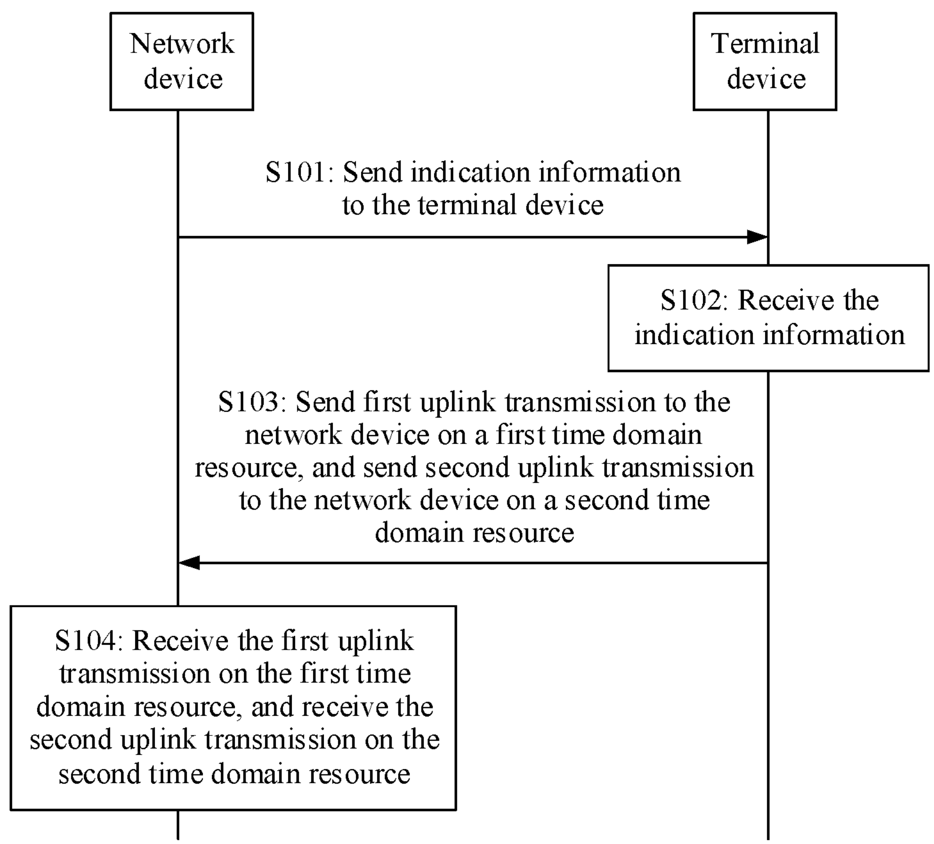
FIG. 2 is a signaling flowchart of a data transmission method according to an embodiment of this disclosure.

FIG. 2 is a signaling flowchart of a data transmission method according to an embodiment of this disclosure. In this embodiment, a terminal device may use a diversity antenna to measure an inter-frequency cell while using a main antenna to receive data of a serving cell or send data of the serving cell. As shown in FIG. 2, the method may include the following steps.

S101: A network device sends indication information to the terminal device.

The indication information is used to indicate a first time domain resource used by the terminal device to send first uplink transmission. Another feature of the indication information is not limited in this embodiment of this disclosure. A person skilled in the art may understand that the indication information may still use a term of uplink grant (UL grant) in a 5G mobile communications system, or may use another term. Therefore, a name of the indication information in various communications systems is not limited in this embodiment of this disclosure. Optionally, the network device may send the indication information by using downlink control signaling, or may send the indication information by using other signaling.

S102: The terminal device receives the indication information.

S103: The terminal device sends the first uplink transmission to the network device on the first time domain resource, and sends second uplink transmission to the network device on a second time domain resource.

The second time domain resource is a time domain resource determined by the terminal device based on the first time domain resource, and the first time domain resource and the second time domain resource are consecutive or inconsecutive in time.

S104: The network device receives the first uplink transmission on the first time domain resource, and receives the second uplink transmission on the second time domain resource.

The first uplink transmission may be uplink transmission that the network device schedules the terminal device to send, to be specific, uplink transmission that is sent after the terminal device receives a UL grant sent by the network device and that is sent on the first time domain resource indicated by the UL grant. In some embodiments, the first uplink transmission may also be referred to as a scheduled uplink (SUL) burst or SUL transmission. It should be noted that before the terminal device needs to send the first uplink transmission, the terminal device needs to first send a scheduling request (SR) to the network device, to request the network device to allocate a resource to the terminal device. Further, the first uplink transmission further corresponds to a first frequency domain resource. For example, the first frequency domain resource includes at least one physical resource block (PRB). Optionally, the first frequency domain resource may be indicated by the network device to the terminal device by using the indication information, or may be indicated by the network device to the terminal device by using other indication information. This is not limited.

The second uplink transmission may be uplink transmission that is sent by the terminal device in a grant-free manner, to be specific, uplink transmission that is autonomously sent by the terminal device on a time domain resource semi-statically configured by the network device. In other words, the second time domain resource used to send the second uplink transmission is not dynamically scheduled by the network device by using a UL grant. Therefore, before the terminal device needs to send the second uplink transmission, the terminal device does not need to send an SR to the network device, and does not need to wait for the network device to send the UL grant. Therefore, data transmission efficiency and channel usage efficiency can be improved. In some embodiments, the second uplink transmission may also be referred to as grant-free uplink (GUL) transmission, a GUL burst, autonomous uplink (AUL) transmission, or an AUL burst. Further, the second uplink transmission further corresponds to a second frequency domain resource. For example, the second frequency domain resource includes at least one physical resource block. Optionally, the second frequency domain resource is configured by the network device for the terminal device by using higher layer signaling, and/or other indication information such as physical layer control signaling. This is not limited.

The second uplink transmission (namely, the uplink transmission that is sent in the grant-free manner) may have at least one of the following features:

1. Before sending the uplink transmission, the terminal device does not need to send an SR to the network device, and does not need to send the uplink transmission based on dynamic scheduling of the network device. Instead, the terminal device autonomously determines to send the uplink transmission.

2. Different from those of the first uplink transmission (namely, the uplink transmission that is sent by the terminal device based on scheduling of the network device), a GUL time domain resource and/or a GUL frequency domain resource used to send the second uplink transmission are/is semi-statically configured by the network device for the terminal device. The GUL time domain resource is also referred to as a time domain resource used for grant-free transmission. In other words, the second uplink transmission is not dynamically scheduled by the network device to the terminal device by using the UL grant. Optionally, the GUL time domain resource and the GUL frequency domain resource may be configured by the network device for the terminal device by using higher layer signaling (for example, RRC signaling) and/or physical layer control signaling. In other words, the GUL time domain resource is periodic, or the GUL time domain resource is a consecutive time domain resource. In this embodiment of this disclosure, the second time domain resource may be a part of the time domain resource that is semi-statically configured by the network device and that is used for grant-free transmission. It should be noted that the physical layer control signaling may be scrambled by using a first user-specific radio network temporary identifier (RNTI), for example, scrambled by using a GUL cell radio network temporary identifier (GUL C-RNTI), an AUL C-RNTI, or a semi-persistent scheduling C-RNTI (SPS C-RNTI). The UL grant used to schedule the first uplink transmission is scrambled by using a second user-specific RNTI, and the second user-specific RNTI is different from the first user-specific RNTI. For example, the second user-specific RNTI is a C-RNTI.

3. Before sending the second uplink transmission, the terminal device may report grantless uplink control information (G-UCI) to the network device. The G-UCI is control information corresponding to the second uplink transmission. The G-UCI may include at least one piece of information of HARQ process number information of a hybrid automatic repeat request (HARQ) process corresponding to at least one data packet included in the second uplink transmission, new data indicator (NDI) information, redundancy version (RV) information corresponding to the at least one data packet included in the second uplink transmission, and user identity (UE ID) information of the terminal device.

It may be understood that the first time domain resource is a time domain resource corresponding to the first uplink transmission. In other words, the terminal device occupies the first time domain resource to send the first uplink transmission.

It may be understood that the second time domain resource is a time domain resource corresponding to the second uplink transmission. In other words, the terminal device occupies the second time domain resource to send the second uplink transmission.

It may be understood that the first time domain resource for sending the first uplink transmission or the second time domain resource for sending the second uplink transmission may include at least one time unit used to transmit uplink information. For example, the time unit may be a transmission time interval (transmission time interval, TTI). The TTI may be a 1-ms TTI, or may be a short transmission time interval (sTTI) shorter than 1 ms. That is, a length of a time domain resource occupied by the sTTI is shorter than that of the 1-ms TTI. In other words, when a data channel corresponds to the sTTI, a length of a time domain resource occupied by the data channel is shorter than 1 ms. An optional length that may be supported by the sTTI includes structures such as seven time domain symbols, one time domain symbol, two time domain symbols, three time domain symbols, or four time domain symbols. The time domain symbol herein may be a single carrier frequency division multiple access (SC-FDMA) symbol, or may be an orthogonal frequency division multiple access symbol (OFDMA), or the like. The sTTI may alternatively support another TTI length shorter than 1 ms. Details are not described. In some embodiments, the 1-ms TTI may also be referred to as a subframe whose length is 1 ms, and the sTTI shorter than 1 ms may also be referred to as a mini-slot.

When the first time domain resource or the second time domain resource includes a plurality of time units, the plurality of time units may be consecutive in time. The "consecutive" herein may mean that channel occupation is consecutive, that is, the terminal device continuously occupies the plurality of time units to send information, or may mean that sequence numbers of the time units (for example, TTIs or subframes) are consecutive. In other words, in the plurality of time units that are consecutive in time, there may be no gap or there may be a gap between any two neighboring time units. For example, the terminal device may not occupy a time domain resource at an end position of a previous time unit to send uplink transmission, and reserve the time domain resource as idle; or the terminal device does not occupy a time domain resource at a start position of a next time unit to send uplink transmission, and reserve the time domain resource as idle. This is not limited in this embodiment of this disclosure. That is, any one of the plurality of time units may be a complete time unit, or may be a part of a time unit.

Optionally, when the first time domain resource includes a plurality of time units, the first time domain resource for sending the first uplink transmission may be scheduled by using one UL grant, or may be scheduled by using at least two UL grants. To be specific, each of the at least two UL grants schedules at least one time unit used to send the first uplink transmission. For example, the first time domain resource for sending the first uplink transmission includes four time units #1 to #4 that are consecutive in time and that are scheduled by using a first UL grant and a second UL grant. For example, the two UL grants each are used to schedule two time units. In this case, the first UL grant may be used to schedule the time units #1 and #2, and the second UL grant may be used to schedule the time units #3 and #4.

In this embodiment, the terminal device may perform third channel listening on a channel before sending the first uplink transmission. The third channel listening may be, for example, the first-type channel listening described above. A type of the channel listening performed by the terminal device before the terminal device sends the first uplink transmission may be specifically indicated by the network device by using downlink control information (for example, the indication information in step S101). For example, the type may be notified by using the at least one UL grant for scheduling the first uplink transmission. Optionally, the terminal device may alternatively obtain, in an existing manner of obtaining a channel listening type, the type of the channel listening performed by the terminal device before the terminal device sends the first uplink transmission. Details are not described.

After the channel listening succeeds, the terminal device may access the channel and may continuously occupy the channel for a period of time. A time length for continuously occupying the channel does not exceed a length of an MCOT corresponding to the third channel listening. Because the first uplink transmission is uplink transmission that the network device schedules the terminal device to send, the following problems may exist: The network device does not schedule, for the terminal device, the first time domain resource that matches the length of the MCOT. As a result, when the terminal device sends the first uplink transmission by using the first time domain resource, the entire MCOT cannot be completely occupied. Alternatively, the network device schedules, for the terminal device, the first time domain resource that matches the length of the MCOT, but the terminal device cannot complete the first-type channel listening before the first time unit of the first time domain resource, but accesses the channel only in a relatively later time unit of the first time domain resource. Consequently, when the terminal device sends the first uplink transmission by using a remaining time domain resource of the first time domain resource, the entire MCOT cannot be completely occupied.

Therefore, in this embodiment, when the first uplink transmission sent by the terminal device cannot completely occupy the MCOT, that is, the length of the first time domain resource for sending the first uplink transmission is less than the length of the MCOT, the terminal device may continue to transmit the second uplink transmission by using a part or all of a remaining time of the MCOT (that is, the second time domain resource), and does not need to perform the first-type channel listening for the second uplink transmission again. That is, the terminal device sends the first uplink transmission on the first time domain resource and sends the second uplink transmission on the second time domain resource, so that the network device can receive the first uplink transmission on the first time domain resource and receive the second uplink transmission on the second time domain resource. In other words, the MCOT corresponding to the third channel listening includes the first time domain resource and the second time domain resource. In this manner, resource utilization and channel utilization of the MCOT can be improved.

For example, it is assumed that the first time domain resource that is scheduled by the network device for the terminal device and that is used to send the first uplink transmission is a subframe #n+1 to a subframe #n+4, the terminal device completes the first-type channel listening (namely, the third channel listening) in a subframe #n, and the length of the MCOT corresponding to the first-type channel listening (namely, the third channel listening) is eight subframes. In other words, the terminal device may send uplink transmission in the subframe #n+1 to a subframe #n+8. In this case, when the terminal device sends the first uplink transmission by using the first time domain resource, the subframe #n+5 to the subframe #n+8 are idle subframes. Therefore, the terminal device may send the second uplink transmission by using some or all of the subframe #n+5 to the subframe #n+8, and does not need to perform the first-type channel listening for the second uplink transmission again.

For example, it is assumed that the first time domain resource that is scheduled by the network device for the terminal device and that is used to send the first uplink transmission is a subframe #n+1 to a subframe #n+8, the terminal device completes the first-type channel listening (namely, the third channel listening) in the subframe #n+2, and the length of the MCOT corresponding to the first-type channel listening (namely, the third channel listening) is eight subframes. In other words, the terminal device may send uplink transmission in the subframe #n+3 to a subframe #n+10. In this case, when the terminal device sends the first uplink transmission by using the remaining available resource (the subframe #n+3 to the subframe #n+8) of the first time domain resource, the subframe #n+9 and the subframe #n+10 are idle subframes. Therefore, the terminal device may send the second uplink transmission by using either or both of the subframe #n+9 and the subframe #n+10, and does not need to perform the first-type channel listening for the second uplink transmission again.

On the other hand, the terminal device may perform the third channel listening on the channel before sending the second uplink transmission. The third channel listening may be, for example, the first-type channel listening described above. After the channel listening succeeds, the terminal device may access the channel and may continuously occupy the channel to send the second uplink transmission. A maximum time length for continuously occupying the channel does not exceed the length of the MCOT corresponding to the third channel listening. If the second uplink transmission cannot completely occupy the MCOT corresponding to the third channel listening, in other words, a length of the second time domain resource for sending the second uplink transmission is less than the length of the MCOT, the terminal device may continue to transmit the first uplink transmission by using a part or all of a remaining time of the MCOT (namely, the first time domain resource), and does not need to perform the first-type channel listening for the first uplink transmission again. That is, the terminal device sends the first uplink transmission on the first time domain resource and sends the second uplink transmission on the second time domain resource, so that the network device can receive the first uplink transmission on the first time domain resource and receive the second uplink transmission on the second time domain resource. In other words, the MCOT corresponding to the third channel listening includes the first time domain resource and the second time domain resource. In this manner, resource utilization and channel utilization of the MCOT can be improved.

There may be the following two cases in which the MCOT corresponding to the third channel listening includes the first time domain resource and the second time domain resource:

Optionally, a sum of time lengths of the first time domain resource and the second time domain resource does not exceed the maximum channel occupancy time corresponding to the third channel listening. For example, the first time domain resource includes subframes {#n+12, #n+13}. It is assumed that the terminal device may send the second uplink transmission before the first uplink transmission, the length of the MCOT corresponding to third channel listening that is performed by the terminal device before sending the second uplink transmission is 6 ms, and a length of one subframe is 1 ms. In this case, the length of the second time domain resource may be 4 ms, and the second time domain resource occupies subframes {#n+8, #n+9, #n+10, #n+11}, so that the sum of the lengths of the first time domain resource and the second time domain resource does not exceed the length of the MCOT.

Optionally, a sum of a time length of the first time domain resource, a time length of the second time domain resource, and a gap between the first time domain resource and the second time domain resource does not exceed the maximum channel occupancy time corresponding to the third channel listening. The gap may be an idle time in which the terminal device does not send any uplink information on the channel. In other words, the gap between the first time domain resource and the second time domain resource is also counted into the maximum channel occupancy time corresponding to the third channel listening. During specific implementation, the gap may be an idle time that does not exceed a predefined time length. For example, the predefined time length is 25 μs. It may be understood that, between the first time domain resource and the second time domain resource, an idle time (for example, a gap used for channel listening of single-slot CCA) within 25 μs may be counted into the maximum channel occupancy time corresponding to the third channel listening, but an idle time exceeding 25 μs may not be counted into the maximum channel occupancy time corresponding to the third channel listening.

It may be understood that the first time domain resource and the second time domain resource do not overlap in time. For example, when the first time domain resource is later than the second time domain resource, a start moment of the first time domain resource is not earlier than an end moment of the second time domain resource. When the first time domain resource is earlier than the second time domain resource, a start moment of the second time domain resource is not earlier than an end moment of the first time domain resource.

Optionally, the length of the MCOT corresponding to the first-type channel listening that is performed by the terminal device before sending the first uplink transmission when the first time domain resource is earlier than the second time domain resource in time may be the same as or different from the length of the MCOT corresponding to the first-type channel listening that is performed by the terminal device before sending the second uplink transmission when the second time domain resource is earlier than the first time domain resource in time. This may be specifically determined based on a service priority of the first uplink transmission and/or a service priority of the second uplink transmission.

In this embodiment, the second time domain resource is a time domain resource determined by the terminal device based on the first time domain resource. How the terminal device determines the second time domain resource based on the first time domain resource is described below from a perspective that the first time domain resource and the second time domain resource are consecutive or inconsecutive in time.

In a first case, the first time domain resource and the second time domain resource are consecutive in time. Details are as follows.

Figure 3:
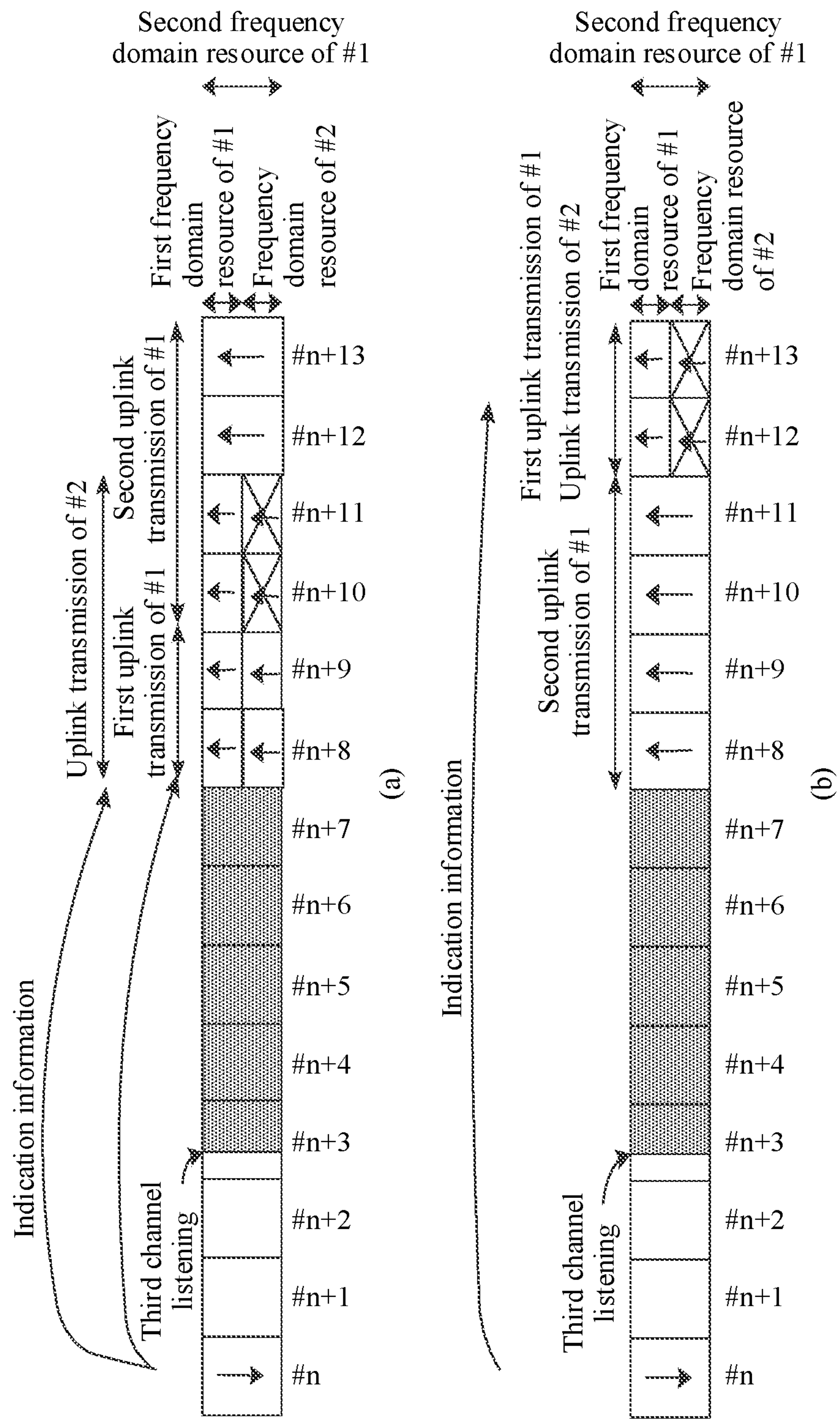
FIG. 3 is a schematic diagram of a time domain resource according to an embodiment of this disclosure.

FIG. 3 is a schematic diagram of a time domain resource according to an embodiment of this disclosure. As shown in FIG. 3, in the prior art, the network device may schedule at least two terminal devices in a same time unit, so that the at least two terminal devices may simultaneously send uplink transmission in the same time unit by using orthogonal frequency domain resources. In other words, the terminal device and another terminal device may simultaneously send uplink transmission in a frequency division multiplexing manner. As a result, that the first time domain resource and the second time domain resource are consecutive in time may cause interference to the another terminal device.

As shown in FIG. 3(*a*), an example in which the second time domain resource for sending the second uplink transmission is later than the first time domain resource for sending the first uplink transmission is used. It is assumed that the network device schedules, by using indication information, a terminal device (#1) to send the first uplink transmission in subframes #n+8 and #n+9, and schedules a terminal device (#2) to send uplink transmission in subframes #n+8 to #n+11, and the terminal device (#1) and the terminal device (#2) send the uplink transmission in the subframes #n+8 and #n+9 in the frequency division multiplexing manner.

After the terminal device (#1) accesses the channel before the subframe #n+8 by performing the third channel listening, the terminal device can occupy the channel in subframes #n+8 to #n+13. According to the indication information sent by the network device, the first uplink transmission of the terminal device (#1) ends in the subframe #n+9. However, because the terminal device (#1) does not know a time domain resource and a frequency domain resource that are scheduled by the network device for the another terminal device, the terminal device (#1) cannot determine whether the uplink transmission of the terminal device (#2) ends in the subframe #n+9, and cannot determine whether the frequency domain resource for sending the second uplink transmission collides with a frequency domain resource of the terminal device (#2). The second frequency domain resource that is semi-statically configured by the network device for the terminal device and that is used to send the second uplink transmission usually occupies full bandwidth of a carrier. As a result, if the terminal device (#1) directly sends the second uplink transmission in the subframe #n+10, interference may be caused to the terminal device (#2).

As shown in FIG. 3(*b*), an example in which the first time domain resource for sending the first uplink transmission is later than the second time domain resource for sending the second uplink transmission is used. It is assumed that the network device schedules, by using indication information, a terminal device (#1) to send the first uplink transmission in subframes #n+12 and #n+13, and schedules a terminal device (#2) to send uplink transmission in the subframes #n+12 and #n+13, and the terminal device (#1) and the terminal device (#2) send the uplink transmission in the subframes #n+12 and #n+13 in the frequency division multiplexing manner.

After the terminal device (#1) accesses the channel before a subframe #n+8 by performing the third channel listening, the terminal device can occupy the channel in the subframes #n+8 to #n+13. In this case, if the terminal device (#1) sends the second uplink transmission in the subframes #n+8 to #n+11, because the second frequency domain resource for sending the second uplink transmission usually occupies full bandwidth of a carrier, the second uplink transmission blocks the terminal device (#2) in performing channel listening for sending the uplink transmission. Consequently, the terminal device (#2) cannot access the channel before the subframe #n+12, and channel access of the terminal device (#2) is affected.

Therefore, to avoid the foregoing problem, when the first frequency domain resource used by the terminal device to send the first uplink transmission is the same as the second frequency domain resource used to send the second uplink transmission, the first time domain resource and the second time domain resource may be consecutive in time. Because the second frequency domain resource for sending the second uplink transmission usually occupies the full bandwidth of the carrier, when the second frequency domain resource is the same as the first frequency domain resource, it indicates that the terminal device and the another terminal device do not send data on the first time domain resource in the frequency division multiplexing manner, and the another terminal device does not continuously send the uplink transmission on a time domain resource after the terminal device sends the first uplink transmission. Therefore, the terminal device may send the second uplink transmission immediately after sending the first uplink transmission. In other words, the end moment of the first time domain resource is the start moment of the second time domain resource. Alternatively, the terminal device may send the first uplink transmission immediately after the second uplink transmission. In other words, the end moment of the second time domain resource is the start moment of the first time domain resource.

Alternatively, when the first frequency domain resource includes all available frequency domain resources on the carrier carrying the first uplink transmission, the first time domain resource and the second time domain resource are consecutive in time. When the first frequency domain resource includes all the available frequency domain resources on the carrier carrying the first uplink transmission, it indicates that all the available frequency domain resources that can be used to send uplink transmission on the carrier are used to send the first uplink transmission, and no remaining frequency domain resource is used by the another terminal device. Therefore, the terminal device and the another terminal device do not send data on the first time domain resource in the frequency division multiplexing manner, and the another terminal device does not continuously send the uplink transmission on a time domain resource after the terminal device sends the first uplink transmission. In this scenario, the terminal device may send the second uplink transmission immediately after sending the first uplink transmission. In other words, the end moment of the first time domain resource is the start moment of the second time domain resource. Alternatively, the terminal device may send the first uplink transmission immediately after the second uplink transmission. In other words, the end moment of the second time domain resource is the start moment of the first time domain resource. The carrier herein may alternatively be a subband, and the subband or the carrier corresponds to a frequency domain range in which the terminal device performs channel listening. For example, the terminal device performs channel listening on a 20 MHz carrier to access a channel on the carrier, or the terminal device performs channel listening on a 20 MHz subband to access a channel on the subband. Optionally, all the available frequency domain resources on the carrier or the subband include: all frequency domain resources on the carrier or the subband, or all frequency domain resources used by the terminal device to send uplink information on the carrier or the subband. The uplink information may be data information, or may include at least one of data information, control information, and a reference signal. In some embodiments, all the available frequency domain resources on the carrier or the subband do not include a guard band on the carrier or the subband.

Alternatively, when the first frequency domain resource includes a full bandwidth resource on the carrier carrying the first uplink transmission, the first time domain resource and the second time domain resource are consecutive in time. When the first frequency domain resource includes the full bandwidth resource on the carrier carrying the first uplink transmission, it indicates that all frequency domain resources on the carrier are used to send the first uplink transmission, and no remaining frequency domain resource is used by the another terminal device. Therefore, the terminal device and the another terminal device do not send data on the first time domain resource in the frequency division multiplexing manner, and the another terminal device does not continuously send the uplink transmission on a time domain resource after the terminal device sends the first uplink transmission. In this scenario, the terminal device may send the second uplink transmission immediately after sending the first uplink transmission. In other words, the end moment of the first time domain resource is the start moment of the second time domain resource. Alternatively, the terminal device may send the first uplink transmission immediately after the second uplink transmission. In other words, the end moment of the second time domain resource is the start moment of the first time domain resource. The carrier herein may alternatively be a subband. Optionally, the full bandwidth resource on the carrier or the subband includes: all frequency domain resources on the carrier or the subband, or all bandwidth resources used by the terminal device to send uplink information on the carrier or the subband. The uplink information may be data information, or may include at least one of data information, control information, and a reference signal. In some embodiments, the full bandwidth resource on the carrier or the subband does not include a guard band (guard band) on the carrier or the subband.

Alternatively, when the first frequency domain resource includes all available physical resource blocks on the carrier carrying the first uplink transmission, the first time domain resource and the second time domain resource are consecutive in time. To be specific, when the first frequency domain resource includes all physical resource blocks that are on the carrier and that can be used to send uplink transmission, it indicates that all the available physical resource blocks on the carrier are used to send the first uplink transmission, and no available physical resource block is used by the another terminal device. Therefore, the terminal device and the another terminal device do not send data on the first time domain resource in the frequency division multiplexing manner, and the another terminal device does not continuously send the uplink transmission on a time domain resource after the terminal device sends the first uplink transmission. In this scenario, the terminal device may send the second uplink transmission immediately after sending the first uplink transmission. In other words, the end moment of the first time domain resource is the start moment of the second time domain resource. Alternatively, the terminal device may send the first uplink transmission immediately after the second uplink transmission. In other words, the end moment of the second time domain resource is the start moment of the first time domain resource. The carrier herein may alternatively be a subband. Optionally, all the available physical resource blocks (PRB) on the carrier or the subband include: all frequency domain resources on the carrier or the subband, or all frequency domain resources used by the terminal device to send uplink information on the carrier or the subband. The uplink information may be data information, or may include at least one of data information, control information, and a reference signal. In some embodiments, all the available physical resource blocks on the carrier or the subband do not include a guard band on the carrier or the subband.

It may be understood that the first time domain resource and the second time domain resource are consecutive in time is merely an example. A person skilled in the art may understand that, when the foregoing condition is not met or in any case, the first time domain resource and the second time domain resource may also be consecutive in time. This is not limited in this embodiment.

It should be understood that, that the first time domain resource and the second time domain resource are consecutive in time is also referred to as that the first uplink transmission and the second uplink transmission are continuous in time.

When the first time domain resource and the second time domain resource are consecutive in time, and the second time domain resource is earlier than the first time domain resource, the terminal device may determine the end moment or an end time unit of the second time domain resource based on the start moment or a start time unit of the first time domain resource. For example, the terminal device may use the start moment of the first time domain resource as the end moment of the second time domain resource, or make the start time unit of the first time domain resource adjacent to the end time unit of the second time domain resource.

When the first time domain resource and the second time domain resource are consecutive in time, and the second time domain resource is later than the first time domain resource, the terminal device may determine the start moment or a start time unit of the second time domain resource based on the end moment or an end time unit of the first time domain resource. For example, the terminal device may make the start moment of the second time domain resource the same as the end moment of the first time domain resource, or make the start time unit of the second time domain resource adjacent to the end time unit of the first time domain resource.

The second time domain resource determined above may be a subset of the GUL time domain resource that is semi-statically configured by the network device for the terminal device and that is used to send the second uplink transmission, or may not be a resource in the GUL time domain resource. This is not limited. For example, when the GUL time domain resource semi-statically configured by the network device by using the higher layer signaling and/or the physical layer control signaling includes subframes {#1, #2}, {#5, #6}, and the like, if the first time domain resource is a subframe #4, the terminal device may determine that the second time domain resource is {#5, #6}. For another example, when the GUL time domain resource semi-statically configured by the network device includes subframes {#1, #2}, {#5, #6}, {#9, #10}, and the like, if the first time domain resource is a subframe #4 and the UL MCOT is 6 ms, the second time domain resource determined by the terminal device is {#5, #6, #7, #8, #9}. The subframes #7 and #8 are not included in the configured GUL time domain resource.

It may be understood that, that the second uplink transmission is earlier than the first uplink transmission includes that the end moment or the end time unit corresponding to the second time domain resource for sending the second uplink transmission is not later than the start moment or the start time unit of the first time domain resource for sending the first uplink transmission. That the second uplink transmission is later than the first uplink transmission includes that the start moment or the start time unit of the second time domain resource for sending the second uplink transmission is not earlier than the end moment or the end time unit of the first time domain resource for sending the first uplink transmission.

The start time unit is the first time unit in at least one time unit included in the time domain resource (the first time domain resource or the second time domain resource), or the start time unit is the first time unit in at least one time unit occupied by the time domain resource (the first time domain resource or the second time domain resource). The end time unit is the last time unit in the at least one time unit included in the time domain resource. Optionally, the start time unit may be the first subframe included in the time domain resource or the first time domain symbol (symbol) in the first subframe included in the time domain resource, or may be the first time domain symbol in the first subframe occupied by the time domain resource. The first time domain symbol may belong to the time domain resource, or may not belong to the time domain resource. For example, the time domain resource is a symbol #1 to a symbol #13 in a subframe #n, and the start time unit is a symbol #0 in the subframe #n. In addition, as mentioned later, when the start time unit is used to send a reservation signal, the start time unit may alternatively be a time unit between a subframe start boundary of the first subframe (or a start boundary of the first symbol in the first subframe) in the at least one subframe occupied by the time domain resource and the start moment at which the terminal device sends the data information in the at least one subframe occupied by the time domain resource.

Optionally, when the first time domain resource and the second time domain resource are consecutive in time, and the first time domain resource is earlier than the second time domain resource in time, the start time unit in which the terminal device sends the second uplink transmission (or the start time unit corresponding to the second time domain resource) is used to carry the data information or the reservation signal. The reservation signal is a signal of another type other than the data information or control information. The reservation signal may be a fill-in signal, a reference signal such as a demodulation reference signal (DMRS) or a sounding reference signal (SRS), a cyclic shift (CP) signal of a data symbol, or a preamble sequence. For example, it is assumed that a protocol specifies that data information of the second uplink transmission starts to be sent from a predefined moment of a time unit (for example, the second symbol of a subframe), and the end moment of the first uplink transmission is usually earlier than the start moment of sending the data information of the second uplink transmission. In this case, the terminal device may send the reservation signal between the end moment of the first uplink transmission and the start moment of sending the data information of the second uplink transmission, to ensure continuity of channel occupation. It is assumed that a protocol specifies that data information of the second uplink transmission starts to be sent from a predefined moment of a time unit (for example, the second symbol of a subframe), and the end moment of the first uplink transmission is exactly at the start moment of sending the data information of the second uplink transmission. In this case, the terminal device may directly send the data information of the second uplink transmission without sending the reservation signal.

It should be noted that when the start time unit corresponding to the second uplink transmission (or the second time domain resource) is used to carry the data information, when the terminal device performs rate matching on the first subframe or the first time unit of the second time domain resource, the data information in the start time unit needs to be considered. When a time domain resource corresponding to a start part of the second uplink transmission is used to carry the reservation signal, when the terminal device performs rate matching on the first subframe or the first time unit of the second time domain resource, the data information in the start time unit does not need to be considered.

Optionally, when the first time domain resource and the second time domain resource are consecutive in time, and the second time domain resource is earlier than the first time domain resource in time, the start time unit in which the terminal device sends the first uplink transmission is used to carry the data information or the reservation signal. For descriptions of this part, refer to the foregoing descriptions of "the start time unit in which the terminal device sends the second uplink transmission is used to carry the data information or the reservation signal". Details are not described again.

In a second case, the first time domain resource and the second time domain resource are inconsecutive in time. Details are as follows.

Optionally, the terminal device may determine, based on the first frequency domain resource, that the first time domain resource and the second time domain resource are inconsecutive in time. With reference to the foregoing descriptions, when the first frequency domain resource is different from the second frequency domain resource, the first time domain resource and the second time domain resource are inconsecutive in time. Alternatively, when the first frequency domain resource does not include all available frequency domain resources on a carrier carrying the first uplink transmission, the first time domain resource and the second time domain resource are inconsecutive in time. Alternatively, when the first frequency domain resource does not include a full bandwidth resource on a carrier carrying the first uplink transmission (that is, the first frequency domain resource occupies partial bandwidth partial bandwidth), the first time domain resource and the second time domain resource are inconsecutive in time. Alternatively, when the first frequency domain resource does not include all available physical resource blocks on a carrier carrying the first uplink transmission, the first time domain resource and the second time domain resource are inconsecutive in time.

It should be understood that, that the first time domain resource and the second time domain resource are inconsecutive in time is also referred to as that the first uplink transmission and the second uplink transmission are discontinuous in time.

It may be understood that the first time domain resource and the second time domain resource are inconsecutive in time is merely an example. A person skilled in the art may understand that, when the foregoing condition is not met or in any case, the first time domain resource and the second time domain resource may also be inconsecutive in time. This is not limited in this embodiment.

When the first time domain resource and the second time domain resource are inconsecutive in time, if the first time domain resource is earlier than the second time domain resource in time, there may be a first time interval between the end moment of the first time domain resource in time and the start moment of the second time domain resource in time. In the first time interval, the terminal device may perform first channel listening to determine whether the channel is idle. Further, when the channel is idle (that is, the first channel listening performed on the channel succeeds), the terminal device sends the second uplink transmission on the second time domain resource. In other words, the second uplink transmission received by the network device is uplink transmission sent by the terminal device on the second time domain resource when the terminal device successfully performs the first channel listening on the channel. Performing the first channel listening avoids interference, caused by sending the second uplink transmission, to another terminal device sending uplink transmission. Optionally, the first channel listening is channel listening that belongs to a type different from that of the third channel listening (namely, the channel listening that is performed by the terminal device before sending the first uplink transmission). For example, the first channel listening may be channel listening of a short-listening type, for example, single-slot CCA. Considering that the terminal device has preempted the channel through the third channel listening, when the first time domain resource does not exceed the maximum channel occupancy time, the terminal device may continue to perform the channel listening of the short-listening type on a remaining time domain resource in the maximum channel occupancy time, to access the channel and send the second uplink transmission. In this manner, the terminal device can quickly access the channel and complete sending of the second uplink transmission.

It may be understood that the first time interval (which may also be referred to as a reserved idle time or a gap) may include a tail part of an end time unit of the first time domain resource, or may include a head part of a start time unit of the second time domain resource, or may include both the tail part of the end time unit of the first time domain resource and the head part of the start time unit of the second time domain resource. That is, the first time interval exists between the end time unit of the first time domain resource and the start time unit of the second time domain resource. When the first time interval includes the tail part of the end time unit of the first time domain resource, it indicates that an end moment or an end symbol of the last time unit for sending the first uplink transmission is earlier than an end boundary of the last time unit (for example, an end boundary of the last subframe). When the first time interval includes the head part of the start time unit of the second time domain resource, it indicates that a start moment or a start symbol of the first time unit for sending the second uplink transmission is later than a start boundary of the first time unit (for example, a start boundary of the first subframe). In this case, the start moment of the second uplink transmission may be autonomously determined by the terminal device, or may be predefined, or may be configured by using higher layer signaling. This is not limited.

A length of the first time interval is not limited in this embodiment of this disclosure. Optionally, the first time interval may be greater than or equal to one time unit, or may be less than one time unit (for example, one subframe). For example, the first time interval is a time length of at least one symbol, or is a partial time length of one symbol (less than the time length of one symbol), or is a time length for performing single-slot CCA once.

Optionally, in some embodiments, the first time interval may be less than a length of one time unit (for example, one symbol or one subframe). That is, the start time unit (for example, a start subframe) of the second time domain resource is enabled, by using the first time interval, to be a next time unit (for example, a next subframe) after the last time unit (for example, an end subframe) of the first time domain resource. In this implementation, if the terminal device fails to perform the single-slot CCA before a start moment of the next time unit, the terminal device abandons sending the second uplink transmission.

Optionally, the first time interval is a time length configured by the network device by using higher layer signaling.

Optionally, the first time interval is determined by the terminal device, and the first time interval is greater than or equal to a first time interval threshold. The first time interval threshold may be predefined, or may be configured by the network device by using higher layer signaling.

When the first time domain resource and the second time domain resource are inconsecutive in time, and the first time domain resource is earlier than the second time domain resource, the terminal device may determine the start moment or the start time unit of the second time domain resource based on the end moment or the end time unit of the first time domain resource. For example, the terminal device may use, as the first time interval, a time interval between the end moment or the end time unit of the first time domain resource and the start moment or the start time unit of the second time domain resource. The second time domain resource determined above may be a subset of the GUL time domain resource that is semi-statically configured by the network device for the terminal device, or may not be a resource in the GUL time domain resource, or the like. As describe above, this is not limited.

Correspondingly, when the first time domain resource and the second time domain resource are inconsecutive in time, if the second time domain resource is earlier than the first time domain resource in time, there is a second time interval between the end moment of the second time domain resource in time and the start moment of the first time domain resource in time. In the second time interval, the terminal device may perform second channel listening to determine whether the channel is idle. Further, when the channel is idle (that is, the second channel listening performed on the channel succeeds), the terminal device sends the first uplink transmission on the first time domain resource. In other words, the first uplink transmission received by the network device is uplink transmission sent by the terminal device on the first time domain resource when the terminal device successfully performs the second channel listening on the channel. Performing the second channel listening avoids interference, caused by sending the first uplink transmission, to another terminal device. Optionally, the second channel listening is channel listening that belongs to a type different from that of the third channel listening (namely, the channel listening that is performed by the terminal device before sending the second uplink transmission). For example, the second channel listening may be channel listening of a short-listening type, for example, single-slot CCA. Considering that the terminal device has preempted the channel through the third channel listening, when the second time domain resource does not exceed the maximum channel occupancy time, the terminal device may continue to perform the channel listening of the short-listening type on a remaining time domain resource in the maximum channel occupancy time, to access the channel and send the first uplink transmission. In this manner, the terminal device can quickly access the channel and complete sending of the first uplink transmission.

It may be understood that the second time interval (which may also be referred to as a reserved idle time or a gap) may include a tail part of an end time unit of the second time domain resource, or may include a head part of a start time unit of the first time domain resource, or may include both the tail part of the end time unit of the second time domain resource and the head part of the start time unit of the first time domain resource. When the second time interval includes the tail part of the end time unit of the second time domain resource, it indicates that an end moment or an end symbol of the last time unit for sending the second uplink transmission is earlier than an end boundary of the last time unit (for example, an end boundary of the last subframe). When the second time interval includes the head part of the start time unit of the first time domain resource, it indicates that a start moment or a start symbol of the first time unit for sending the first uplink transmission is later than a start boundary of the first time unit (for example, a start boundary of the first subframe). In this case, the end moment of the second uplink transmission may be autonomously determined by the terminal device, or may be predefined, or may be configured by using higher layer signaling. This is not limited.

A length of the second time interval is not limited in this embodiment of this disclosure. Optionally, the second time interval may be greater than or equal to one time unit, or may be less than one time unit (for example, one subframe). For example, the second time interval is a time length of at least one symbol, or is a partial time length of one symbol (less than the time length of one symbol), or is a time length for performing single slot CCA once.

Optionally, in some embodiments, the second time interval may be less than a length of one time unit (for example, one symbol or one subframe). That is, the start time unit (for example, a start subframe) of the first time domain resource is enabled, by using the second time interval, to be a next time unit (for example, a next subframe) after the last time unit (for example, an end subframe) of the second time domain resource. In this implementation, if the terminal device fails to perform the single-slot CCA before a start moment of the next time unit, the terminal device abandons sending the first uplink transmission.

Optionally, the second time interval is a time length configured by the network device by using higher layer signaling.

Optionally, in some embodiments, the terminal device may need to perform the random backoff-based CCA (that is, the second channel listening is the random backoff-based CCA) before the first uplink transmission. In addition, another terminal device that needs to send uplink transmission in the frequency division multiplexing manner with the terminal device may need to perform the random backoff-based CCA. Therefore, the terminal device needs to stop the second uplink transmission in advance, to ensure that a sufficient idle time is reserved for the terminal device or the another terminal device to perform listening of the random backoff-based CCA. Therefore, the second time interval may be greater than or equal to a preset second time interval threshold. The second time interval threshold may be predefined, or may be configured by the network device by using higher layer signaling. For example, the terminal device stops sending the second uplink transmission in advance of k subframes before the start subframe of the first uplink transmission. k is a positive integer. For example, k=1, 2, or 3.

When determining that the first time domain resource and the second time domain resource are inconsecutive in time, and the second time domain resource is earlier than the first time domain resource in time, the terminal device may determine the end moment or the end time unit of the second time domain resource based on the start moment or the start time unit of the first time domain resource. For example, the terminal device may use, as the second time interval, a time interval between the start moment or the start time unit of the first time domain resource and the end moment or the end time unit of the second time domain resource. The second time domain resource determined above may be a subset of the GUL time domain resource that is semi-statically configured by the network device for the terminal device, or may not be a resource in the GUL time domain resource, or the like. This is not limited.

Figure 4:
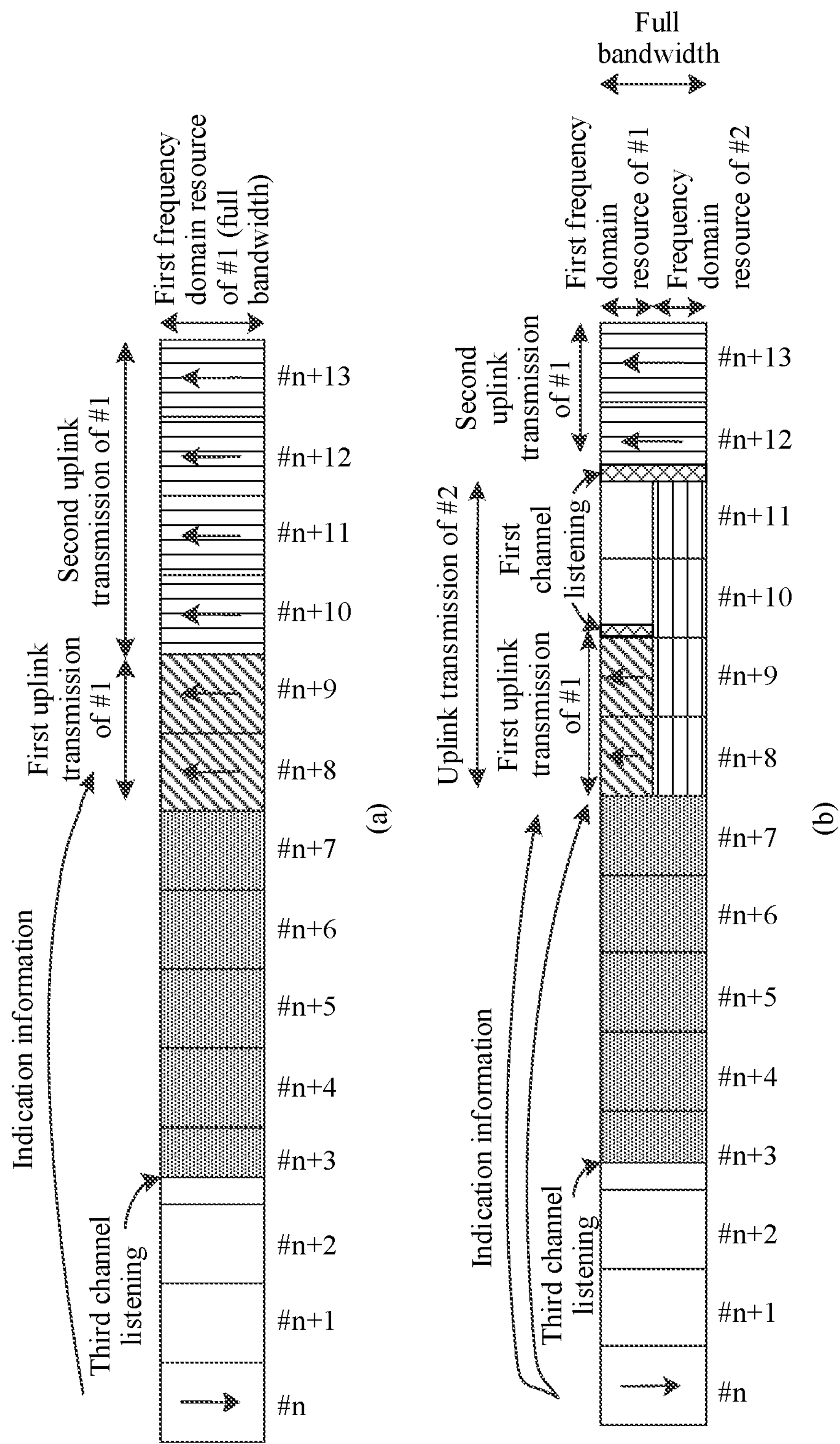
FIG. 4 is a schematic diagram of another time domain resource according to an embodiment of this disclosure.

FIG. 4 is a schematic diagram of another time domain resource according to an embodiment of this disclosure. As shown in FIG. 4(*a*), an example in which the second time domain resource for sending the second uplink transmission is later than the first time domain resource for sending the first uplink transmission is used. It is assumed that the network device schedules, by using indication information, a terminal device (#1) to send the first uplink transmission in subframes #n+8 and #n+9. The first frequency domain resource for sending the first uplink transmission includes a full bandwidth resource on a carrier carrying the first uplink transmission.

After the terminal device (#1) accesses the channel before the subframe #n+8 by performing the third channel listening, the terminal device can occupy the channel in subframes #n+8 to #n+13. According to the indication information sent by the network device, the first uplink transmission of the terminal device (#1) ends in the subframe #n+9. Because the first frequency domain resource includes the full bandwidth resource on the carrier carrying the first uplink transmission, it indicates that all frequency domain resources on the carrier are used to send the first uplink transmission, and no remaining frequency domain resource is used by the another terminal device. In other words, the terminal device and the another terminal device do not simultaneously send uplink transmission before the subframe #n+10 in the frequency division multiplexing manner. Therefore, the terminal device can occupy the channel in the subframes #n+10 to #n+13 to send the second uplink transmission.

As shown in FIG. 4(*b*), the example in which the second time domain resource for sending the second uplink transmission is later than the first time domain resource for sending the first uplink transmission is still used. It is assumed that the network device schedules, by using indication information, a terminal device (#1) to send the first uplink transmission in subframes #n+8 and #n+9, and schedules a terminal device (#2) to send uplink transmission in subframes #n+8 to #n+11. The terminal device (#1) and the terminal device (#2) send the uplink transmission in the subframes #n+8 and #n+9 in the frequency division multiplexing manner After the terminal device (#1) accesses the channel before the subframe #n+8 by performing the third channel listening, the terminal device can occupy the channel in subframes #n+8 to #n+13. According to the indication information sent by the network device, the first uplink transmission of the terminal device (#1) ends in the subframe #n+9. However, because the first frequency domain resource does not include a full bandwidth resource on a carrier carrying the first uplink transmission, to avoid interference to the another terminal device (for example, the terminal device (#2)), after sending the first uplink transmission, the terminal device may first stop to perform the first channel listening, wait until the channel listening succeeds in the subframe #n+12, and then send the second uplink transmission in the subframes #n+12 and #n+13.

Figure 5:
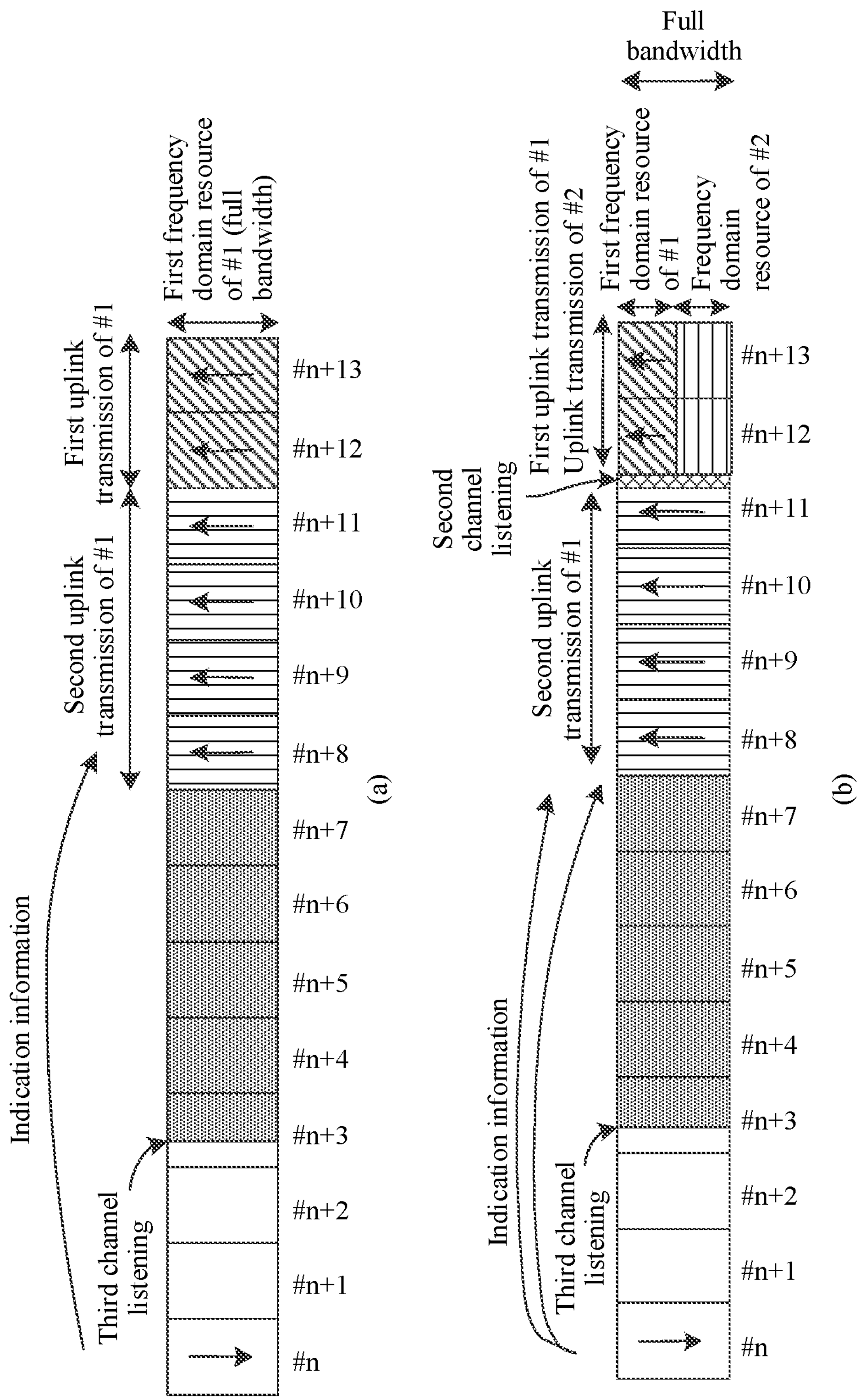
FIG. 5 is a schematic diagram of still another time domain resource according to an embodiment of this disclosure.

FIG. 5 is a schematic diagram of still another time domain resource according to an embodiment of this disclosure. As shown in FIG. 5(*a*), an example in which the second time domain resource for sending the second uplink transmission is earlier than the first time domain resource for sending the first uplink transmission is used. It is assumed that the network device schedules, by using indication information, a terminal device (#1) to send the first uplink transmission in subframes #n+12 and #n+13. The first frequency domain resource for sending the first uplink transmission includes a full bandwidth resource on a carrier carrying the first uplink transmission.

After the terminal device (#1) accesses the channel before a subframe #n+8 by performing the third channel listening, the terminal device can occupy the channel in subframes #n+8 to #n+13. Because the first frequency domain resource includes the full bandwidth resource on the carrier carrying the first uplink transmission, it indicates that all frequency domain resources on the carrier are used to send the first uplink transmission, and no remaining frequency domain resource is used by the another terminal device. In other words, the terminal device and the another terminal device do not simultaneously send uplink transmission in the subframe #n+12 in the frequency division multiplexing manner. Therefore, the terminal device can occupy the channel in the subframes #n+8 to #n+11 to send the second uplink transmission.

As shown in FIG. 5(*b*), the example in which the second time domain resource for sending the second uplink transmission is earlier than the first time domain resource for sending the first uplink transmission is still used. It is assumed that the network device schedules, by using indication information, a terminal device (#1) to send the first uplink transmission in subframes #n+12 and #n+13, and schedules a terminal device (#2) to send uplink transmission in the subframes #n+12 and #n+13. The terminal device (#1) and the terminal device (#2) send the uplink transmission in the subframes #n+12 and #n+13 in the frequency division multiplexing manner After the terminal device (#1) accesses the channel before a subframe #n+8 by performing the third channel listening, the terminal device can occupy the channel in subframes #n+8 to #n+13. Because the first frequency domain resource does not include a full bandwidth resource on a carrier carrying the first uplink transmission, it indicates that another terminal device (for example, the terminal device (#2)) and the terminal device (#1) may send uplink transmission in the frequency division multiplexing manner. Therefore, to avoid interference to the another terminal device, the terminal device may stop the second uplink transmission in advance, to reserve an idle time for performing the second channel listening. For example, the single-slot CCA is performed. The terminal device can occupy the channel in a part of time of the subframes #n+8 to #n+11 to send the second uplink transmission.

According to the data transmission method provided in the embodiments of this disclosure, when the uplink transmission sent by the terminal device cannot completely occupy the MCOT, the terminal device may continue to send other uplink transmission by using the MCOT that is not completely occupied. This can improve the resource utilization and the channel utilization of the MCOT.

Figure 6:
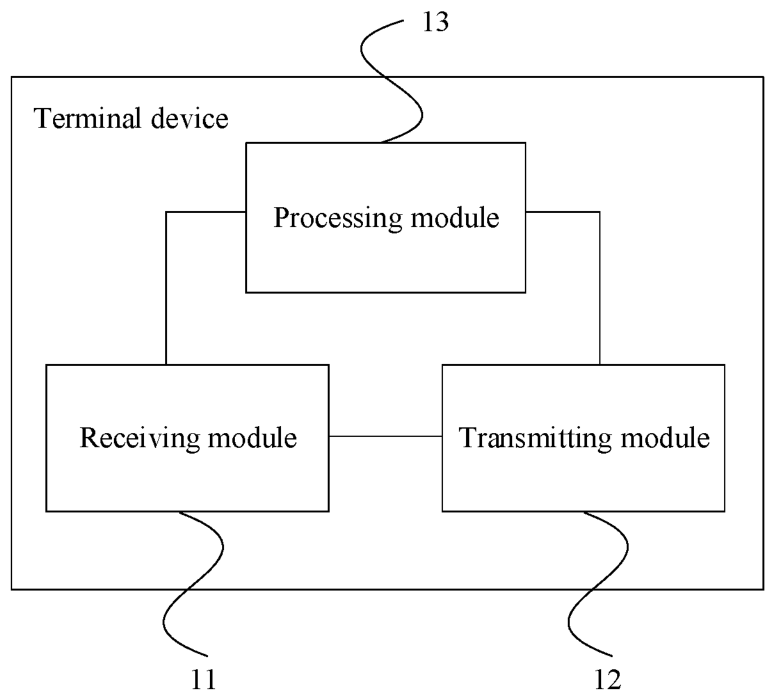
FIG. 6 is a schematic structural diagram of a terminal device according to an embodiment of this disclosure.

FIG. 6 is a schematic structural diagram of a terminal device according to an embodiment of this disclosure. As shown in FIG. 6, the terminal device may include a receiving module 11, a transmitting module 12, and a processing module 13.

The receiving module 11 is configured to receive indication information sent by a network device, where the indication information is used to indicate a first time domain resource used by the terminal device to send first uplink transmission.

The transmitting module 12 is configured to: send the first uplink transmission to the network device on the first time domain resource, and send second uplink transmission to the network device on a second time domain resource, where the second time domain resource is a time domain resource determined by the processing module 13 based on the first time domain resource, and the first time domain resource and the second time domain resource are consecutive or inconsecutive in time. For example, the first uplink transmission is uplink transmission that the network device schedules the terminal device to send, and the second uplink transmission is uplink transmission that is sent by the terminal device in a grant-free manner.

Optionally, when the indication information is further used to indicate a first frequency domain resource used by the terminal device to send the first uplink transmission, that the first time domain resource and the second time domain resource are consecutive in time includes: the first time domain resource and the second time domain resource are consecutive in time when the first frequency domain resource is the same as a second frequency domain resource used to send the second uplink transmission; or the first time domain resource and the second time domain resource are consecutive in time when the first frequency domain resource includes all available frequency domain resources, a full bandwidth resource, or all available physical resource blocks on a carrier carrying the first uplink transmission.

Optionally, when the first time domain resource and the second time domain resource are consecutive in time, and the first time domain resource is earlier than the second time domain resource in time, a start time unit in which the transmitting module 12 sends the second uplink transmission is used to carry data information or a reservation signal. Optionally, when the first time domain resource and the second time domain resource are consecutive in time, and the second time domain resource is earlier than the first time domain resource in time, a start time unit in which the transmitting module 12 sends the first uplink transmission is used to carry the data information or the reservation signal.

Optionally, the indication information is further used to indicate a first frequency domain resource used by the terminal device to send the first uplink transmission, and that the first time domain resource and the second time domain resource are inconsecutive in time includes: the first time domain resource and the second time domain resource are inconsecutive in time when the first frequency domain resource is different from a second frequency domain resource used to send the second uplink transmission; or the first time domain resource and the second time domain resource are inconsecutive in time when the first frequency domain resource does not include all available frequency domain resources, a full bandwidth resource, or all available physical resource blocks on a carrier carrying the first uplink transmission.

Optionally, that the first time domain resource and the second time domain resource are inconsecutive in time includes: the first time domain resource is earlier than the second time domain resource in time, and there is a first time interval between an end moment of the first time domain resource in time and a start moment of the second time domain resource in time. In the implementation, in a possible implementation, the processing module 13 is further configured to perform first channel listening on a channel in the first time interval; and the transmitting module 12 is specifically configured to send the second uplink transmission on the second time domain resource when the processing module 13 successfully performs the first channel listening on the channel.

Optionally, that the first time domain resource and the second time domain resource are inconsecutive in time includes: the second time domain resource is earlier than the first time domain resource in time, and there is a second time interval between an end moment of the second time domain resource in time and a start moment of the first time domain resource in time. In the implementation, in a possible implementation, the processing module 13 is further configured to perform second channel listening on a channel in the second time interval; and the transmitting module 12 is specifically configured to send the first uplink transmission on the first time domain resource when the processing module 13 successfully performs the second channel listening on the channel.

Optionally, a maximum channel occupancy time corresponding to third channel listening includes the first time domain resource and the second time domain resource; and when the first time domain resource is earlier than the second time domain resource in time, the third channel listening is channel listening performed before the terminal device sends the first uplink transmission; or when the second time domain resource is earlier than the first time domain resource in time, the third channel listening is channel listening performed before the terminal device sends the second uplink transmission.

The terminal device provided in this embodiment of this disclosure can perform an action of the terminal device in the foregoing method embodiment. Their implementation principles and technical effects are similar. Details are not described herein again.

Figure 7:
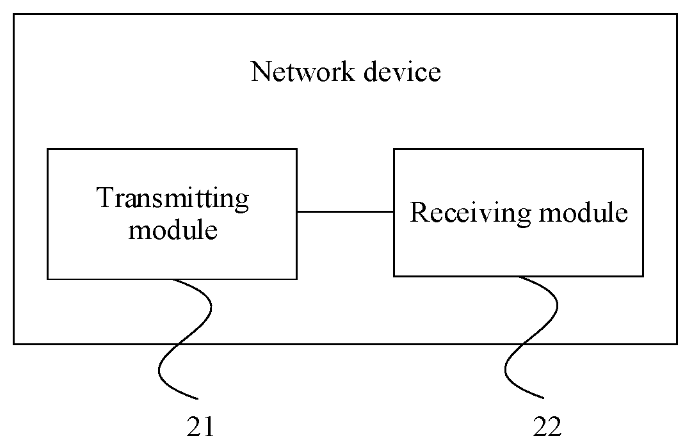
FIG. 7 is a schematic structural diagram of a network device according to an embodiment of this disclosure.

FIG. 7 is a schematic structural diagram of a network device according to an embodiment of this disclosure. As shown in FIG. 7, the network device may include a transmitting module 21 and a receiving module 22.

The transmitting module 21 is configured to send indication information to a terminal device, where the indication information is used to indicate a first time domain resource used by the terminal device to send first uplink transmission.

The receiving module 22 is configured to: receive, on the first time domain resource, the first uplink transmission sent by the terminal device, and receive, on a second time domain resource, second uplink transmission sent by the terminal device, where the second time domain resource is a time domain resource determined by the terminal device based on the first time domain resource, and the first time domain resource and the second time domain resource are consecutive or inconsecutive in time. For example, the first uplink transmission is uplink transmission that the network device schedules the terminal device to send, and the second uplink transmission is uplink transmission that is sent by the terminal device in a grant-free manner.

Optionally, the indication information is further used to indicate a first frequency domain resource used by the terminal device to send the first uplink transmission, and that the first time domain resource and the second time domain resource are consecutive in time includes: the first time domain resource and the second time domain resource are consecutive in time when the first frequency domain resource is the same as a second frequency domain resource used to send the second uplink transmission; or the first time domain resource and the second time domain resource are consecutive in time when the first frequency domain resource includes all available frequency domain resources, a full bandwidth resource, or all available physical resource blocks on a carrier carrying the first uplink transmission.

Optionally, when the first time domain resource and the second time domain resource are consecutive in time, and the first time domain resource is earlier than the second time domain resource in time, a start time unit in which the receiving module 22 receives the second uplink transmission is used to carry data information or a reservation signal. Optionally, in a possible implementation, when the first time domain resource and the second time domain resource are consecutive in time, and the second time domain resource is earlier than the first time domain resource in time, a start time unit in which the receiving module 22 receives the first uplink transmission is used to carry the data information or the reservation signal.

Optionally, the indication information is further used to indicate a first frequency domain resource used by the terminal device to send the first uplink transmission, and that the first time domain resource and the second time domain resource are inconsecutive in time includes: the first time domain resource and the second time domain resource are inconsecutive in time when the first frequency domain resource is different from a second frequency domain resource used to send the second uplink transmission; or the first time domain resource and the second time domain resource are inconsecutive in time when the first frequency domain resource does not include all available frequency domain resources, a full bandwidth resource, or all available physical resource blocks on a carrier carrying the first uplink transmission.

Optionally, that the first time domain resource and the second time domain resource are inconsecutive in time includes: the first time domain resource is earlier than the second time domain resource in time, and there is a first time interval between an end moment of the first time domain resource in time and a start moment of the second time domain resource in time. In the implementation, in a possible implementation, if the terminal device performs first channel listening before sending the second uplink transmission, the second uplink transmission is uplink transmission that is sent by the terminal device on the second time domain resource when the terminal device successfully performs the first channel listening on a channel.

Optionally, that the first time domain resource and the second time domain resource are inconsecutive in time includes: the second time domain resource is earlier than the first time domain resource in time, and there is a second time interval between an end moment of the second time domain resource in time and a start moment of the first time domain resource in time. In the implementation, in a possible implementation, if the terminal device performs second channel listening before sending the first uplink transmission, the first uplink transmission is uplink transmission that is sent by the terminal device on the first time domain resource when the terminal device successfully performs the second channel listening on a channel.

Optionally, a maximum channel occupancy time corresponding to third channel listening includes the first time domain resource and the second time domain resource; and when the first time domain resource is earlier than the second time domain resource in time, the third channel listening is channel listening performed before the terminal device sends the first uplink transmission; or when the second time domain resource is earlier than the first time domain resource in time, the third channel listening is channel listening performed before the terminal device sends the second uplink transmission.

The network device provided in this embodiment of this disclosure can perform an action of the network device in the foregoing method embodiment. Their implementation principles and technical effects are similar. Details are not described herein again.

It should be noted that, it should be understood that the transmitting module may be a transmitter in actual implementation, the receiving module may be a receiver in actual implementation, and the processing module may be implemented by a processing element invoking software, or may be implemented by hardware. For example, the processing module may be an independently disposed processing element, or may be integrated into a chip of the foregoing device for implementation. In addition, the processing module may be stored in a memory of the foregoing device in a form of program code, and is invoked by a processing element of the foregoing device to perform a function of the processing module. In addition, all or some of the modules may be integrated together, or may be implemented separately. The processing element herein may be an integrated circuit and has a signal processing capability. In an implementation process, steps in the foregoing method or the foregoing modules can be implemented by using a hardware integrated logical circuit in the processing element, or by using instructions in a form of software.

For example, the foregoing modules may be configured as one or more integrated circuits for implementing the foregoing method, for example, one or more application-specific integrated circuits (ASIC), one or more microprocessors (DSP), or one or more field programmable gate arrays (FPGA). For another example, when one of the foregoing modules is implemented by a processing element invoking program code, the processing element may be a general-purpose processor, such as a central processing unit (CPU), or another processor that can invoke the program code. For still another example, the modules may be integrated, and implemented in a system-on-a-chip (SOC) form.

Figure 8:
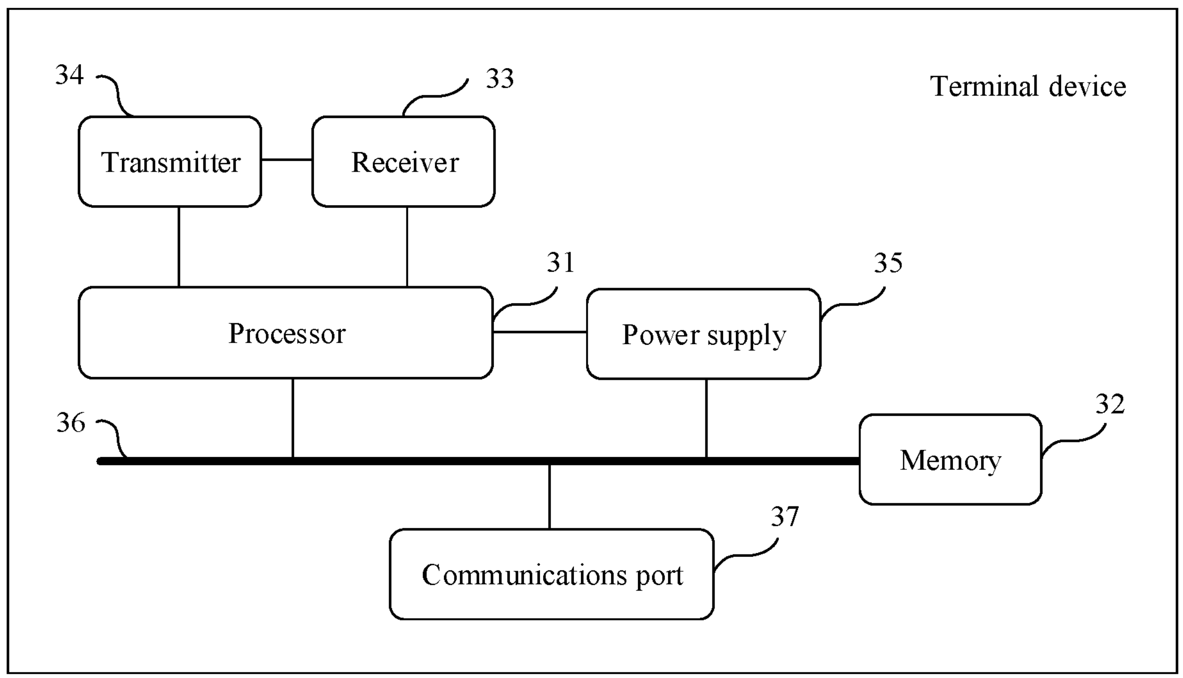
FIG. 8 is a schematic structural diagram of another terminal device according to an embodiment of this disclosure.

FIG. 8 is a schematic structural diagram of another terminal device according to an embodiment of this disclosure. As shown in FIG. 8, the terminal device may include a processor 31 (for example, a CPU), a memory 32, a receiver 33, and a transmitter 34. Both the receiver 33 and the transmitter 34 are coupled to the processor 31. The processor 31 controls a receiving action of the receiver 33 and controls a sending action of the transmitter 34. The memory 32 may include a high-speed RAM memory, or may further include a non-volatile memory NVM, for example, at least one magnetic disk memory. The memory 32 may store various instructions, to complete various processing functions and steps of the method according to the embodiments of this disclosure. Optionally, the terminal device in this embodiment of this disclosure may further include a power supply 35, a communications bus 36, and a communications port 37. The receiver 33 and the transmitter 34 may be integrated into a transceiver of the terminal device, or may be independent transceiver antennas of the terminal device. The communications bus 36 is configured to implement communications connection between the elements. The communications port 37 is configured to implement connection and communication between the terminal device and another peripheral.

In this embodiment of this disclosure, the memory 32 is configured to store computer-executable program code, and the program code includes an instruction. When the processor 31 executes the instruction, the instruction enables the processor 31 to perform a processing action of the terminal device in the foregoing method embodiment, enables the receiver 33 to perform a receiving action of the terminal device in the foregoing method embodiment, and enables the transmitter 34 to perform a sending action of the terminal device in the foregoing method embodiment. Their implementation principles and technical effects are similar. Details are not described herein again.

Figure 9:
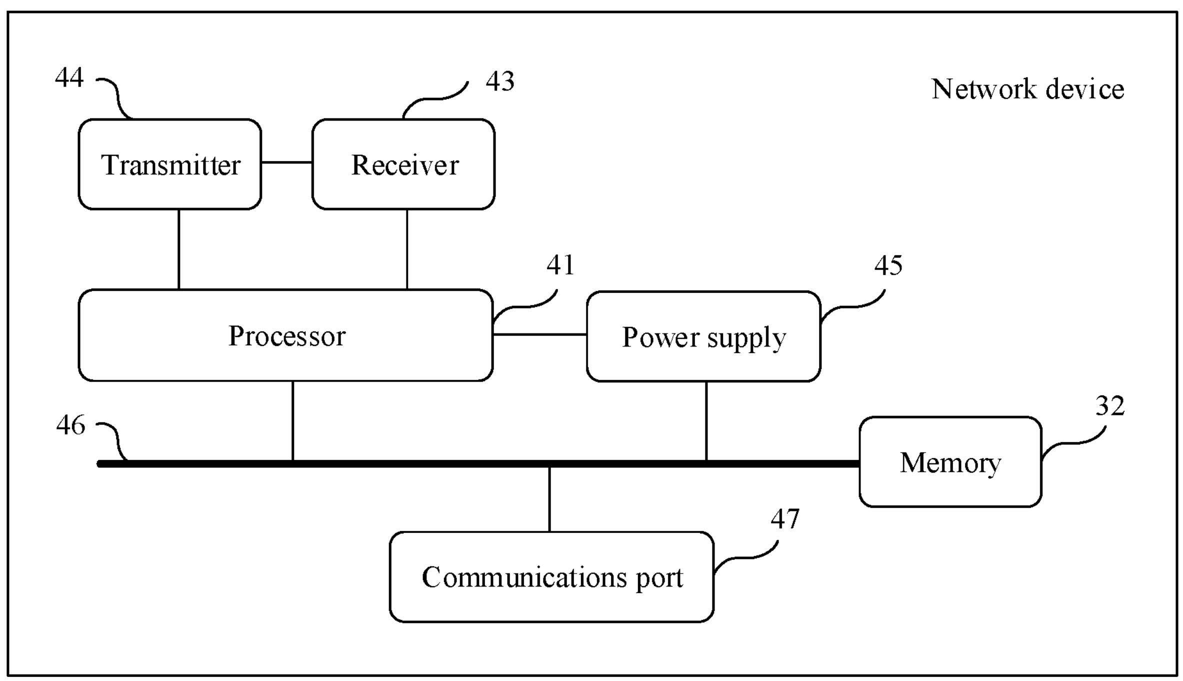
FIG. 9 is a schematic structural diagram of another network device according to an embodiment of this disclosure.

FIG. 9 is a schematic structural diagram of another network device according to an embodiment of this disclosure. As shown in FIG. 9, the network device may include a processor 41 (for example, a CPU), a memory 42, a receiver 43, and a transmitter 44. Both the receiver 43 and the transmitter 44 are coupled to the processor 41. The processor 41 controls a receiving action of the receiver 43 and controls a sending action of the transmitter 44. The memory 42 may include a high-speed RAM memory, or may further include a non-volatile memory NVM, for example, at least one magnetic disk memory. The memory 42 may store various instructions, to complete various processing functions and steps of the method according to the embodiments of this disclosure. Optionally, the network device in this embodiment of this disclosure may further include a power supply 45, a communications bus 46, and a communications port 47. The receiver 43 and the transmitter 44 may be integrated into a transceiver of the network device, or may be independent transceiver antennas of the network device. The communications bus 46 is configured to implement communications connection between the elements. The communications port 47 is configured to implement connection and communication between the network device and another peripheral.

In this embodiment of this disclosure, the memory 42 is configured to store computer-executable program code, and the program code includes an instruction. When the processor 41 executes the instruction, the instruction enables the processor 41 to perform a processing action of the network device in the foregoing method embodiment, enables the receiver 43 to perform a receiving action of the network device in the foregoing method embodiment, and enables the transmitter 44 to perform a sending action of the network device in the foregoing method embodiment. Their implementation principles and technical effects are similar. Details are not described herein again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A data transmission method, comprising:

receiving, by a terminal device, indication information from a network device, wherein the indication information indicates a first time domain resource to be used by the terminal device to send a first uplink transmission;

sending, by the terminal device, the first uplink transmission to the network device on the first time domain resource;

determining, by the terminal device, a second time domain resource based on the first time domain resource; and sending, by the terminal device, a second uplink transmission to the network device on the second time domain resource.

2. The method according to claim 1, wherein the indication information further indicates a first frequency domain resource to be used by the terminal device to send the first uplink transmission and that the first time domain resource and the second time domain resource are consecutive in time; and wherein the first frequency domain resource comprises all available frequency domain resources, a full bandwidth resource, or all available physical resource blocks on a carrier carrying the first uplink transmission.

3. The method according to claim 1, wherein based on the first time domain resource and the second time domain resource being consecutive in time and the first time domain resource being earlier than the second time domain resource in time, a start time unit in which the terminal device sends the second uplink transmission is used to carry data information or a reservation signal.

4. The method according to claim 1, wherein based on the first time domain resource and the second time domain resource being consecutive in time and the second time domain resource being earlier than the first time domain resource in time, a start time unit in which the terminal device sends the first uplink transmission is used to carry data information or a reservation signal.

5. The method according to claim 1, wherein the indication information further indicates a first frequency domain resource to be used by the terminal device to send the first uplink transmission and that the first time domain resource and the second time domain resource are inconsecutive in time; and wherein the first frequency domain resource does not comprise all available frequency domain resources, a full bandwidth resource, or all available physical resource blocks on a carrier carrying the first uplink transmission.

6. The method according to claim 1, wherein the first uplink transmission is scheduled by the network device, and the second uplink transmission is sent by the terminal device in a grant-free manner.

7. A terminal device, comprising:

a processor; and a non-transitory computer-readable storage medium having processor-executable instructions stored thereon;

wherein the processor is configured to execute the processor-executable instructions to facilitate the following being performed by the terminal device:

receiving indication information from a network device, wherein the indication information indicates a first time domain resource to be used by the terminal device to send a first uplink transmission;

sending the first uplink transmission to the network device on the first time domain resource;

determining a second time domain resource based on the first time domain resource; and sending a second uplink transmission to the network device on the second time domain resource.

8. The terminal device according to claim 7, wherein the indication information further indicates a first frequency domain resource to be used by the terminal device to send the first uplink transmission and that the first time domain resource and the second time domain resource are consecutive in time; and wherein the first frequency domain resource comprises all available frequency domain resources, a full bandwidth resource, or all available physical resource blocks on a carrier carrying the first uplink transmission.

9. The terminal device according to claim 7, wherein the indication information further indicates a first frequency domain resource to be used by the terminal device to send the first uplink transmission and that the first time domain resource and the second time domain resource are inconsecutive in time; and wherein the first frequency domain resource does not comprise all available frequency domain resources, a full bandwidth resource, or all available physical resource blocks on a carrier carrying the first uplink transmission.

10. The terminal device according to claim 7, wherein based on the first time domain resource and the second time domain resource being inconsecutive in time and the first time domain resource being earlier than the second time domain resource in time, there is a first time interval between an end moment of the first time domain resource in time and a start moment of the second time domain resource in time.

11. The terminal device according to claim 10, wherein the processor is further configured to execute the processor-executable instructions to facilitate the following being performed by the terminal device:

performing first channel listening on a channel in the first time interval; and sending the second uplink transmission on the second time domain resource based on having successfully performed the first channel listening on the channel.

12. The terminal device according to claim 7, wherein based on the first time domain resource and the second time domain resource being inconsecutive in time and the second time domain resource being earlier than the first time domain resource in time, there is a second time interval between an end moment of the second time domain resource in time and a start moment of the first time domain resource in time.

13. The terminal device according to claim 7, wherein the first uplink transmission is scheduled by the network device, and the second uplink transmission is sent by the terminal device in a grant-free manner.

14. A network device, comprising:

a processor; and a non-transitory computer-readable storage medium having processor-executable instructions stored thereon;

wherein the processor is configured to execute the processor-executable instructions to facilitate the following being performed by the network device:

sending indication information to a terminal device, wherein the indication information indicates a first time domain resource to be used by the terminal device to send a first uplink transmission;

receiving, on the first time domain resource, the first uplink transmission from the terminal device; and receiving, on a second time domain resource, a second uplink transmission from the terminal device, wherein the second time domain resource is based on the first time domain resource.

15. The network device according to claim 14, wherein the indication information further indicates a first frequency domain resource to be used by the terminal device to send the first uplink transmission and that the first time domain resource and the second time domain resource are consecutive in time; and wherein the first frequency domain resource comprises all available frequency domain resources, a full bandwidth resource, or all available physical resource blocks on a carrier carrying the first uplink transmission.

16. The network device according to claim 14, wherein the indication information further indicates a first frequency domain resource to be used by the terminal device to send the first uplink transmission and that the first time domain resource and the second time domain resource are inconsecutive in time; and wherein the first frequency domain resource does not comprise all available frequency domain resources, a full bandwidth resource, or all available physical resource blocks on a carrier carrying the first uplink transmission.

17. The network device according to claim 14, wherein based on the first time domain resource and the second time domain resource being inconsecutive in time and the second time domain resource being earlier than the first time domain resource in time, there is a second time interval between an end moment of the second time domain resource in time and a start moment of the first time domain resource in time.

18. The network device according to claim 17, wherein the first uplink transmission is sent by the terminal device on the first time domain resource based on the terminal device successfully performing second channel listening on a channel.

19. The network device according to claim 14, wherein the first uplink transmission is scheduled by the network device, and the second uplink transmission is sent by the terminal device in a grant-free manner.

20. The network device according to claim 14, wherein a maximum channel occupancy time corresponding to third channel listening comprises the first time domain resource and the second time domain resource; and based on the first time domain resource being earlier than the second time domain resource in time, the third channel listening is performed before the terminal device sends the first uplink transmission, or based on the second time domain resource being earlier than the first time domain resource in time, the third channel listening is performed before the terminal device sends the second uplink transmission.

* * * * *